(12) United States Patent
Fu et al.

(10) Patent No.: US 10,389,982 B1
(45) Date of Patent: Aug. 20, 2019

(54) VIDEO SECURITY CAMERA WITH TWO FIELDS OF VIEW

(71) Applicant: Kuna Systems Corporation, San Bruno, CA (US)

(72) Inventors: Sai-Wai Fu, Los Altos Hills, CA (US); Haomiao Huang, Redwood City, CA (US); Harold G. Sampson, Sunnyvale, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

(21) Appl. No.: 16/111,669

(22) Filed: Aug. 24, 2018

Related U.S. Application Data

(60) Provisional application No. 62/661,341, filed on Apr. 23, 2018.

(51) Int. Cl.
| | | |
|---|---|---|
| *H04N 7/08* | (2006.01) | |
| *H04N 7/18* | (2006.01) | |
| *G08B 3/10* | (2006.01) | |
| *H04N 7/14* | (2006.01) | |

(52) U.S. Cl.
CPC .............. *H04N 7/181* (2013.01); *G08B 3/10* (2013.01); *H04N 7/0806* (2013.01); *H04N 7/142* (2013.01)

(58) Field of Classification Search
CPC ...... H04N 7/181; H04N 7/0806; H04N 7/142; G08B 3/10
See application file for complete search history.

(56) References Cited

U.S. PATENT DOCUMENTS

| | | | |
|---|---|---|---|
| 2015/0022620 A1* | 1/2015 | Siminoff .............. | H04M 11/025 348/14.02 |
| 2017/0178434 A1* | 6/2017 | Firth .................. | G07C 9/00571 |
| 2018/0103200 A1* | 4/2018 | Bracy ..................... | H04L 51/32 |
| 2018/0233025 A1* | 8/2018 | Modestine .......... | G08B 27/003 |

OTHER PUBLICATIONS

Digital Trends, "Nest Hello Review", https://www.digitaltrends.com/smart-home-reviews/nest-hello-review/. pp. 1-19.
Delany, "Ring Video Doorbell", https://www.pcmag.com/article2/0.2817,2479253.aspm, 2015, pp. 1-7.

* cited by examiner

*Primary Examiner* — Christopher G Findley
(74) *Attorney, Agent, or Firm* — Christopher P. Maiorana, PC

(57) ABSTRACT

An apparatus includes a first video capture device, a second video capture device and a circuit. The first video capture device may be configured to capture a first plurality of video frames of a first field of view. The second video capture device may be configured to capture a second plurality of video frames of a second field of view. The circuit may be configured to generate a first video stream in response to the first video frames, generate a second video stream in response to the second video frames and wirelessly communicate the first video stream and the second video stream to a device. The first field of view may capture an area in front of the apparatus. The second field of view may capture an area under and behind the apparatus. The second field of view may comprise a blind spot of the first field of view.

20 Claims, 15 Drawing Sheets

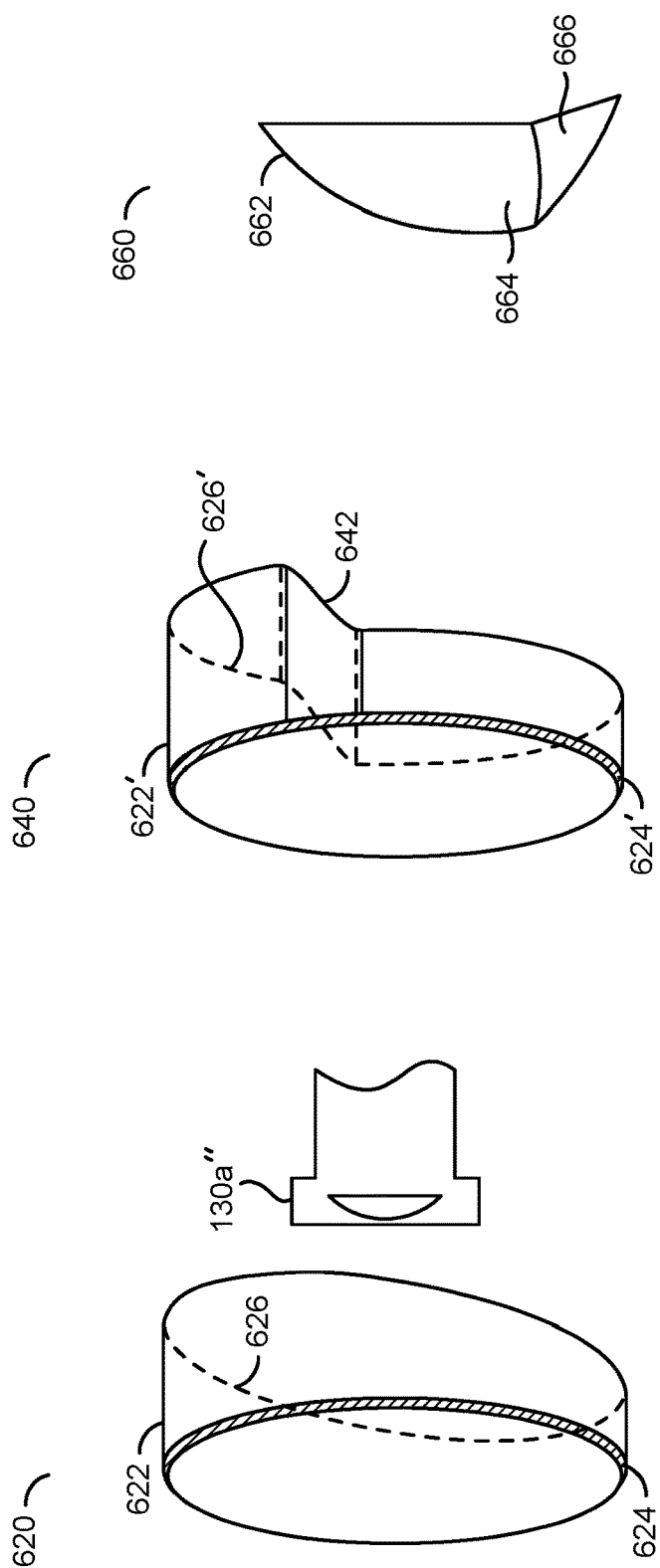

VIDEO SECURITY CAMERA WITH TWO FIELDS OF VIEW

This application relates to (i) U.S. Provisional Application No. 62/661,341, filed Apr. 23, 2018 and (ii) U.S. Ser. No. 15/611,975, filed Jun. 2, 2017, which are both hereby incorporated by reference in their entirety.

FIELD OF THE INVENTION

The invention relates to cameras generally and, more particularly, to a method and/or apparatus for implementing a video security camera with two fields of view.

BACKGROUND

"Smart" home products that connect to home networks are increasing in popularity. In particular, internet-connected security products can reduce home invasions. Conventional home security products capture video of an area near a home or business. Despite the deterrent effects of home security products, package thefts are still common. Because conventional home security products do not provide a view of packages left at the door, packages can be taken after they are delivered but before the intended recipient can retrieve the package. Furthermore, homeowners cannot see if notices are left on the door, or if a door was accidentally left open. Additionally, homeowners cannot see how visitors are interacting with the door (i.e., to see if the visitor is attempting to open the door).

It would be desirable to implement a video security camera with two fields of view.

SUMMARY

The invention concerns an apparatus comprising a first video capture device, a second video capture device and a circuit. The first video capture device may be configured to capture a first plurality of video frames of a first field of view. The second video capture device may be configured to capture a second plurality of video frames of a second field of view. The circuit may be configured to generate a first video stream in response to the first video frames, generate a second video stream in response to the second video frames and wirelessly communicate the first video stream and the second video stream to a user device. The apparatus may be mounted to a vertical surface. The first field of view may capture an area in front of the apparatus. The second field of view may capture an area under and behind the apparatus. The second field of view may comprise a blind spot of the first field of view. The second field of view may include the surface below a level of the apparatus.

BRIEF DESCRIPTION OF THE FIGURES

Embodiments of the invention will be apparent from the following detailed description and the appended claims and drawings in which:

FIG. 21 is a diagram illustrating a wedge prism in front of a camera lens;

FIG. 22 is a diagram illustrating a partial wedge prism; and

FIG. 23 is a diagram illustrating a compound lens.

DETAILED DESCRIPTION OF THE EMBODIMENTS

Embodiments of the present invention include providing a video security camera with two fields of view that may (i) provide a view in front of, behind and below a mounting point, (ii) communicate video data to a user devices, (iii) enable users to see packages left at the door, (iv) enable users to see a door under a camera mount, (v) be connected to a doorbell power supply, (vi) enable remote communication with visitors, (vii) implement a high video quality camera and a low video quality camera, (viii) provide inexpensive home security features and/or (ix) be implemented as one or more integrated circuits.

Figure 1:
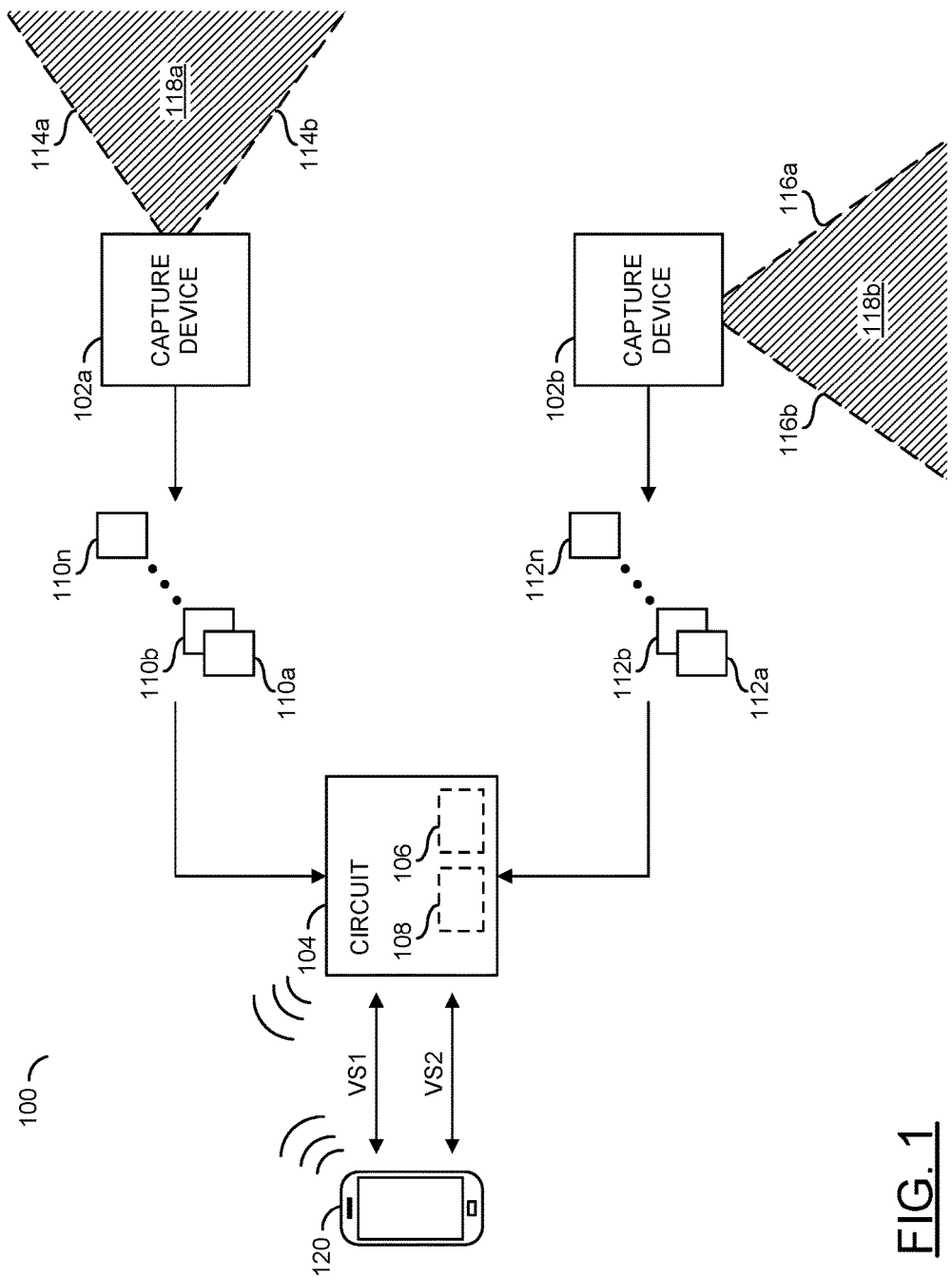
FIG. 1 is a diagram illustrating a block diagram of an example embodiment of the invention.

Referring to FIG. 1, a block diagram illustrating an example embodiment of the invention is shown. An apparatus (or block, or circuit, or device 100) is shown. The apparatus 100 may comprise blocks (or circuits) 102a-102b and/or a block (or circuit) 104. The circuits 102a-102b may implement capture devices (e.g., video and/or image capture devices). The circuit 104 may be a circuit board comprising numerous components that offer various functionality. The circuit 104 may comprise a block (or circuit) 106 and/or a block (or circuit) 108. The circuit 106 may implement a video processor. The circuit 108 may implement a wireless communication device. The circuit 104 may comprise other components (not shown). The number, type and/or arrangement of the components of the apparatus 100 and/or the circuit 104 may be varied according to the design criteria of a particular implementation.

The capture device 102a may be configured to capture one or more video frames 110a-110n. In the example shown, lines 114a-114b may represent a boundary and/or range of a field of view. The video frames 110a-110n may comprise video and/or image frames of the field of view 114a-114b. The capture device 102b may be configured to capture one or more video frames 112a-112n. In the example shown, lines 116a-116b may represent a boundary and/or range of a field of view. The video frames 112a-112n may comprise video and/or image frames of the field of view 116a-116b.

An area 118a is shown between the lines 114a-114b. The area 118a may represent an area (e.g., an environment) within the field of view 114a-114b captured by the capture device 102a. In one example, the area 118a may be an area located in front of the apparatus 100. An area 118b is shown between the lines 116a-116b. The area 118b may represent an area (e.g., an environment) within the field of view 116a-116b captured by the capture device 102b. In one example, the area 118b may be an area located under and/or behind the apparatus 100. In some embodiments, the area 118a of the field of view 114a-114b may partially overlap the area 118b of the field of view 116a-116b (e.g., the capture devices 102a-102b may each implement a wide angle lens). However, the area 118b of the field of view 116a-116b may comprise a blind spot of the area 118a of the field of view 114a-114b. For example, the blind spot of the capture device 102a may be an area that is not captured within the field of view 114a-114b.

The capture device 102a may present the video frames 110a-110n to the circuit 104. The capture device 102b may present the video frames 112a-112n to the circuit 104. The circuit 104 may generate a video stream (e.g., VS1) in response to the video frames 110a-110n. The circuit 104 may generate a video stream (e.g., VS2) in response to the video frames 112a-112n. In one example, the video processor 106 may be configured to perform video operations on the video frames 110a-110n and/or the video frames 112a-112n to generate video data (e.g., the video stream VS1 and/or the video stream VS2). The video operations performed by the circuit 104 and/or the video processor 106 may be varied according to the design criteria of a particular implementation.

A block (or circuit) 120 is shown. The circuit 120 may be a circuit separate from the apparatus 100. For example, the circuit 120 may not have a wired connection to the apparatus 100. In some embodiments, the circuit 120 may be separated from the apparatus 100 by long distances (e.g., miles). The circuit 120 may be a computing device (or user device). In the example shown, the computing device 120 may be a smartphone (e.g., a handheld or portable user device). In some embodiments, the computing device 120 may be implemented as a desktop computer, a laptop computer, a smart watch, a tablet computing device, etc. Generally, the computing device 120 may be a device configured to communicate wirelessly, display video content and/or receive/transmit audio. The type of device implemented as the computing device 120 may be varied according to the design criteria of a particular implementation.

The circuit 104 may wirelessly communicate the video stream VS1 and/or the video stream VS2 to the smartphone 120. In an example, the communication device 108 may be configured to format the video streams VS1 and/or VS2 to be communicated and/or establish a wireless communication link between the circuit 104 and the smartphone 120 (e.g., using Wi-Fi, cellular communication such as 3G/4G/LTE/5G, Bluetooth, etc.). In the example shown, the video stream VS1 and VS2 are shown being transmitted wirelessly to the smartphone 120. However, other data may be transmitted between the smartphone 120 and the circuit 104 (e.g., instructions and/or commands may be sent from the smartphone 120 to the circuit 104, audio for implementing a two-way intercom may be transmitted, information about objects detected by video analysis performed on the video frames 110a-110n and/or the video frames 112a-112n may be transmitted by the circuit 104 to the smartphone 120, etc.). The type of information communicated, and/or the wireless communication protocol(s) implemented may be varied according to the design criteria of a particular implementation.

Figure 2:
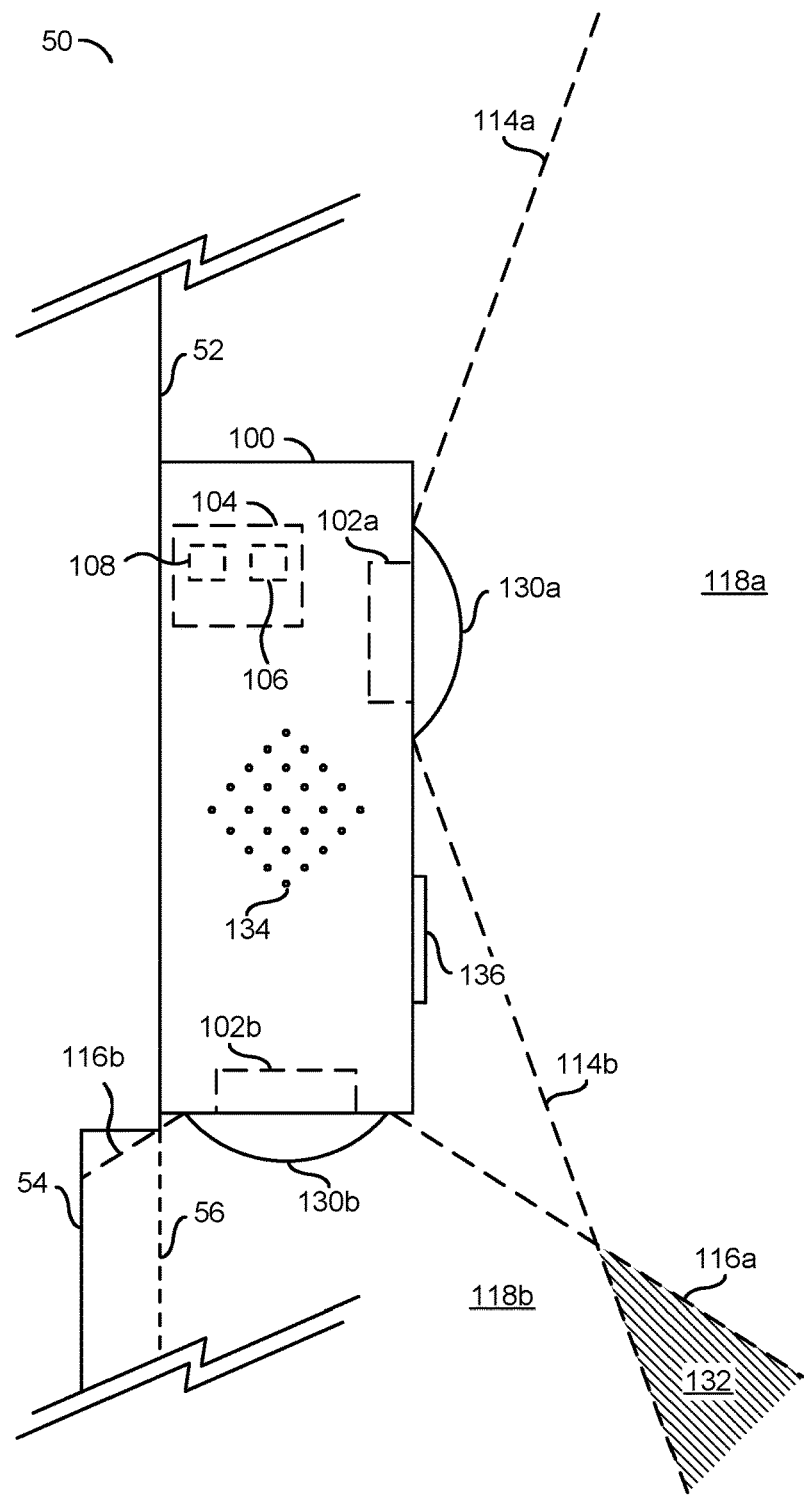
FIG. 2 is a diagram illustrating a diagram of an example embodiment of the invention.

Referring to FIG. 2, a diagram illustrating an example embodiment 50 of the apparatus 100 is shown. In the example embodiment 50, the apparatus 100 is shown mounted to a surface 52 (e.g., a vertical surface, such as a wall, or a surface that is generally vertically oriented). For example, the apparatus 100 may be mounted to a wall of a premises. For example, the apparatus 100 may be mounted to the wall 52 near (e.g., next to, above, beside, etc.) a door. Generally the apparatus 100 may be mounted to a vertical surface. The wall 52 may have a recessed section 54. A dotted line 56 is shown. The dotted line 56 may represent a plane of the wall 52. The recessed section 54 may have an area behind the plane 56 of the wall 52. In the example shown, the apparatus 100 is shown mounted to the wall 52 above the recessed section 54.

The apparatus 100 may comprise a housing to contain the capture devices 102a-102b and/or the circuit 104 (e.g., the video processor 106, the wireless communication device 108, other components, etc.). A lens 130a and a lens 130b are shown attached to (or sticking out from) the housing of the apparatus 100. The lens 130a may be a component of the capture device 102a. The lens 130b may be a component of the capture device 102b. In an example, the lenses 130a-130b may each implement a wide angle lens.

The lens 130a is shown on a front of the apparatus 100 (e.g., facing away from the wall 52). The lens 130a on the front of the apparatus 100 may capture the field of view 114a-114b. For example, the field of view 114a-114b is shown capturing the area 118a in front of the apparatus 100 (e.g., to capture guests approaching a premises). The lens 130b is shown on a bottom side of the apparatus 100. The lens 130b on the bottom of the apparatus may capture the field of view 116a-116b. For example, the field of view 116a-116b captured by the bottom lens 130b may capture the area 118b below and behind the apparatus 100 (e.g., behind the plane 56 corresponding to the mounting surface 52 for the apparatus 100). In the example shown, the field of view boundary 116b is shown extending into the recessed section 54 below and behind the apparatus 100. The wide angle of the lens 130b may enable the capture device 102b to capture the video frames 112a-112n of the area 118b that may be behind the mounting surface 52 of the apparatus 100.

An area 132 is shown. The area 132 may be an overlapping area of the area 118a captured by the capture device 102a and the area 118b captured by the capture device 102b. For example, the capture devices 102a-102b may both capture the overlapping area 132. In the example shown, the overlapping area 132 may be bounded by the field of view line 114b corresponding to the lens 130a of the capture device 102a and the field of view line 116a corresponding to the lens 130b of the capture device 102b. An area beyond overlapping area 132 (e.g., outside of the area 118a and beyond the line 114b) may be a blind spot of the first field of view 114a-114b of the capture device 102a. The second field of view 116a-116b may capture the area 118b that comprises the blind spot of the first field of view 114a-114b.

The housing of the apparatus 100 is shown having a speaker grille 134. The speaker grille 134 may enable audio to be emitted by an internal speaker of the apparatus 100. For example, the internal speaker may be one of the components of the circuit 104. The speaker grille 134 may enable audio to be received by an internal microphone. For example, the internal microphone may be one of the components of the circuit 104. The speaker and microphone may enable the apparatus 100 to implement a two-way audio communication (e.g., an intercom).

The apparatus 100 may comprise a button 136. The button 136 may enable a visitor to interact with the apparatus 100. In an example, the button 136 may activate an audio alert within a premises (e.g., a doorbell). The button 136 may also activate and/or enable other functionality of the apparatus 100 (e.g., the intercom feature, a visitor identification feature, a configuration feature, etc.).

In some embodiments, the apparatus 100 may be mounted above a doorway and/or access point of the premises (e.g., above a garage door, above a window, above a front door, etc.). In the example shown, an offset portion (e.g., the recessed section 54) of the wall 52 is shown below the apparatus 100 (e.g., a cutout for a door). The field of view 116a-116b of the bottom lens 130b is shown extending behind the apparatus 100 and capturing the offset area 54 of the premises. The field of view 116a-116b of the bottom lens 130b may enable capturing (e.g., streaming and/or recording) of the area below and behind the apparatus 100. For example, the bottom lens 130b may capture packages left in front of the door. The bottom lens 130b may capture the door and/or window. In an example, the bottom lens 130b may provide a view that may show notices attached to the front door and/or a view that shows whether the door is open or closed.

Figure 3:
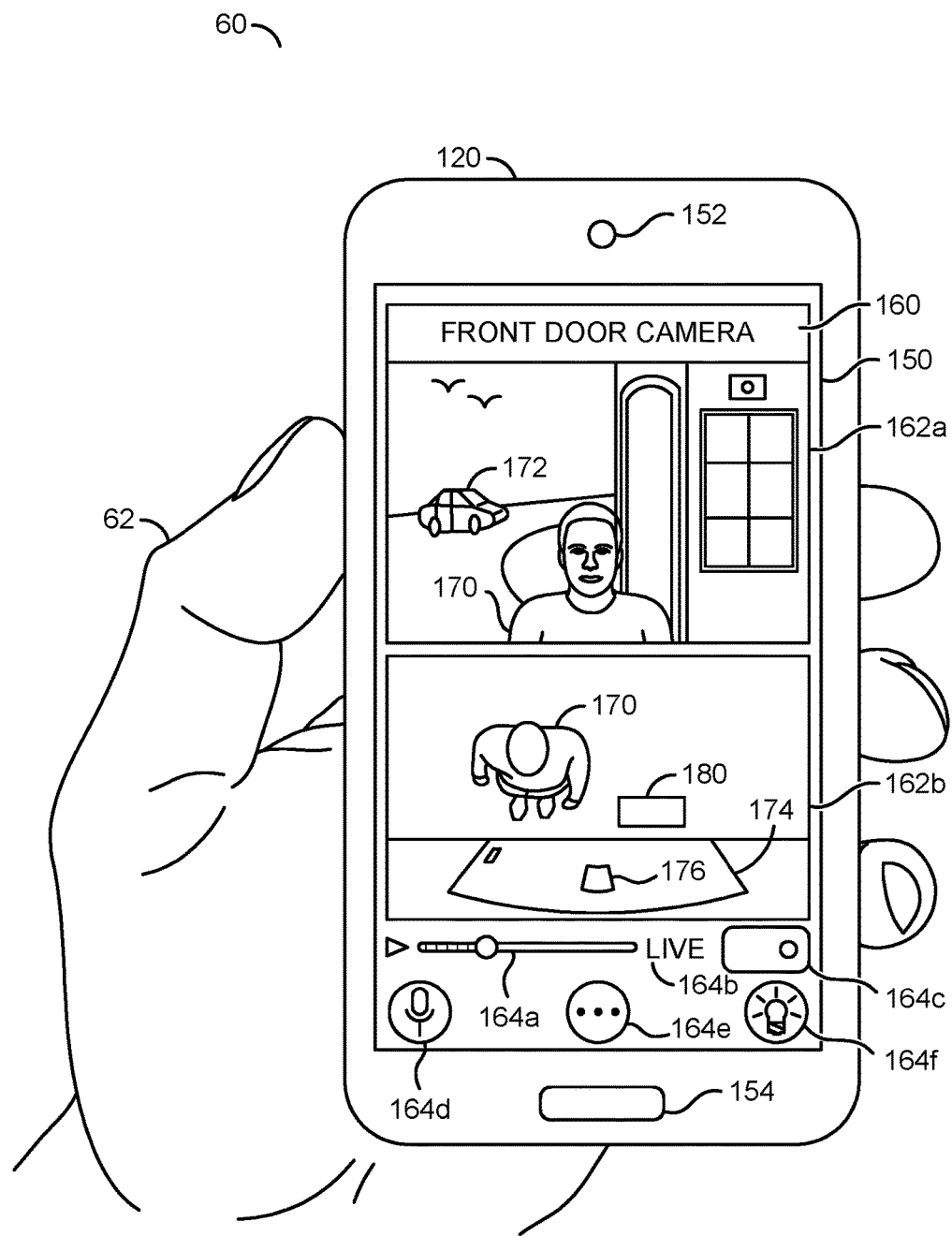
FIG. 3 is a diagram illustrating a user device streaming multiple video streams.

Referring to FIG. 3 a diagram illustrating the user device 120 streaming multiple video streams is shown. An example context 60 of the invention is shown. In the example context 60, the user device 120 is shown held by a user 62. For example, the user device 120 may be a portable (e.g., handheld) device. In the example shown, the user device 120 may be a smartphone.

The smartphone 120 is shown having a display 150, a speaker 152 and a microphone 154. In an example, the display 150 may be a touchscreen display enabling the user 62 to view output from the smartphone 120 and/or provide input (e.g., touch controls) to the smartphone 120. The speaker 152 may playback audio. The microphone 154 may receive audio. In an example, the speaker 152 and the microphone 154 may enable the user 62 to interact with the apparatus 100 as a two-way intercom. In one example, the speaker 152 on the smartphone 120 may playback audio captured and wirelessly transmitted by the apparatus 100 (e.g., a microphone component of the circuit 104). In another example, the microphone 154 on the smartphone 120 may capture audio that may be wirelessly transmitted to the apparatus 100 and the apparatus 100 may playback the audio (e.g., using a speaker component of the circuit 104).

The display 150 is shown displaying a companion application 160. The apparatus 100 may be compatible with the companion application 160. For example, the companion application 160 may be a smartphone app (e.g., iOS app, an Android app). In some embodiments, the companion application 160 may be a computer program (e.g., for Windows, macOS, Linux, etc.). The companion application 160 may enable the user 62 to remotely interact with the features of the apparatus 100. For example, the companion application 160 may be configured to interface with the smartphone microphone 154 and speaker 152 to enable the user 62 to use the apparatus 100 as an intercom (e.g., audio received by the smartphone 120 may be played by the speaker of the apparatus 100 and audio received by the microphone of the apparatus 100 may be played back to the user by the smartphone speaker 154).

In the example shown, the companion application 160 shown on the smartphone 120 may display a video stream 162a and a video stream 162b. The video stream 162a may correspond with the video stream VS1 generated by the apparatus 100. The video stream 162b may correspond with the video stream VS2 generated by the apparatus 100. For example, the apparatus 100 may be configured to wirelessly communicate (e.g., a live stream and/or a recorded file for later playback) the video streams VS1-VS2 to the smartphone 120 using the communication device 108. The companion application 160 may playback the video streams VS1-VS2 as the video streams 162a-162b.

In the example shown, the companion application 160 may further comprise controls 164a-164f. The controls 164a-164f may enable access to various features of the companion application 160. In one example, the control 164a may be a play/pause video progress bar (e.g., used to control what portion of the video streams 162a-162b the user 62 is viewing). In another example, the control 164b may be a live view indicator (e.g., to indicate whether the video streams 162a-162b are live video currently captured by the apparatus 100 or a pre-recorded file). In yet another example, the control 164c may be a toggle button to toggle between options (e.g., enable/disable a live view). In another example, the control 164d may be a button configured to activate/deactivate audio communication (e.g., one-way audio by the user 62 to be played back by the apparatus 100 and/or a two-way intercom to additionally receive audio from the apparatus 100). In still another example, the control 164e may be a button to access other features of the smartphone 120 (e.g., an app-drawer). In another example, the control 164f may be a button configured to control a light that may be coupled with the apparatus 100. The features and/or controls 164a-164f implemented by the companion application 160 may be varied according to the design criteria of a particular implementation.

In the example shown, the companion application 160 operating on the smartphone 120 may show a dual view displaying both video streams 162a-162b. In some embodiments, the companion application 160 may display one of the video streams 162a-162b at a time or neither of the video streams 162a-162b. The dual view may comprise the front view video stream 162a corresponding to the field of view 114a-114b captured by the front facing lens 130a. The dual view may comprise a bottom view video stream 162b corresponding to the field of view 116a-116b captured by the bottom lens 160b.

In the example shown, a visitor 170 and an object (e.g., a vehicle) 172 are shown in the video stream 162a captured by the front capture device 102a. The video stream 162a may be a view of the area 118a in front of the apparatus 100. For example, the apparatus 100 may be located at approximately a head height of the visitor 170. In the example shown, a top down view of the visitor 170 is shown in the video stream 162b captured by the bottom capture device 102b. In an example, the lenses 130a-130b may be implemented using a wide angle and/or fisheye lens providing a 270 degree field of view. For example, some warping may be present on the bottom view video stream 162b.

The bottom view video stream 162b may be a view of the area 118b below and/or behind the apparatus 100. The bottom view video stream 162b may provide a view of the door 174 below a level of the apparatus 100. A notice 176 is shown on the door 174. A package 180 is shown in front of the door 174. The notice 176 and/or the package 180 may not be visible without the field of view 116a-116b provided by the bottom capture device 102b. The bottom view video stream 162b may provide a view of the visitor 170 knocking on the door and/or trying to gain entry (e.g., trying the doorknob).

In an example, the video streams 162a-162b may be played back simultaneously. For example, the front view video stream 162a may show a view of the face of the visitor 170 and the bottom view 162b may show the top down view of the visitor 170 at the same time. For example, if the visitor 170 is a burglar stealing the package 180, the front view video 162a may provide a clear view of the face (e.g., identity) of the visitor 170 but not the package 180 and the bottom view video 162b may show the visitor 170 stealing the package 180 but not provide a view of the face to identify the thief. Similarly, if the visitor 170 is attempting to break into the home by opening the door 174, the front view video 162a may not provide the view of the door 174 but the bottom view video 162b may show the visitor 170 attempting to open the door. The videos 162a-162b captured by both the front capture device 102a and the bottom capture device 102b may be used as evidence for police of the visitor 170 trying to steal the package 180 and/or attempting to break into the premises.

Figure 4:
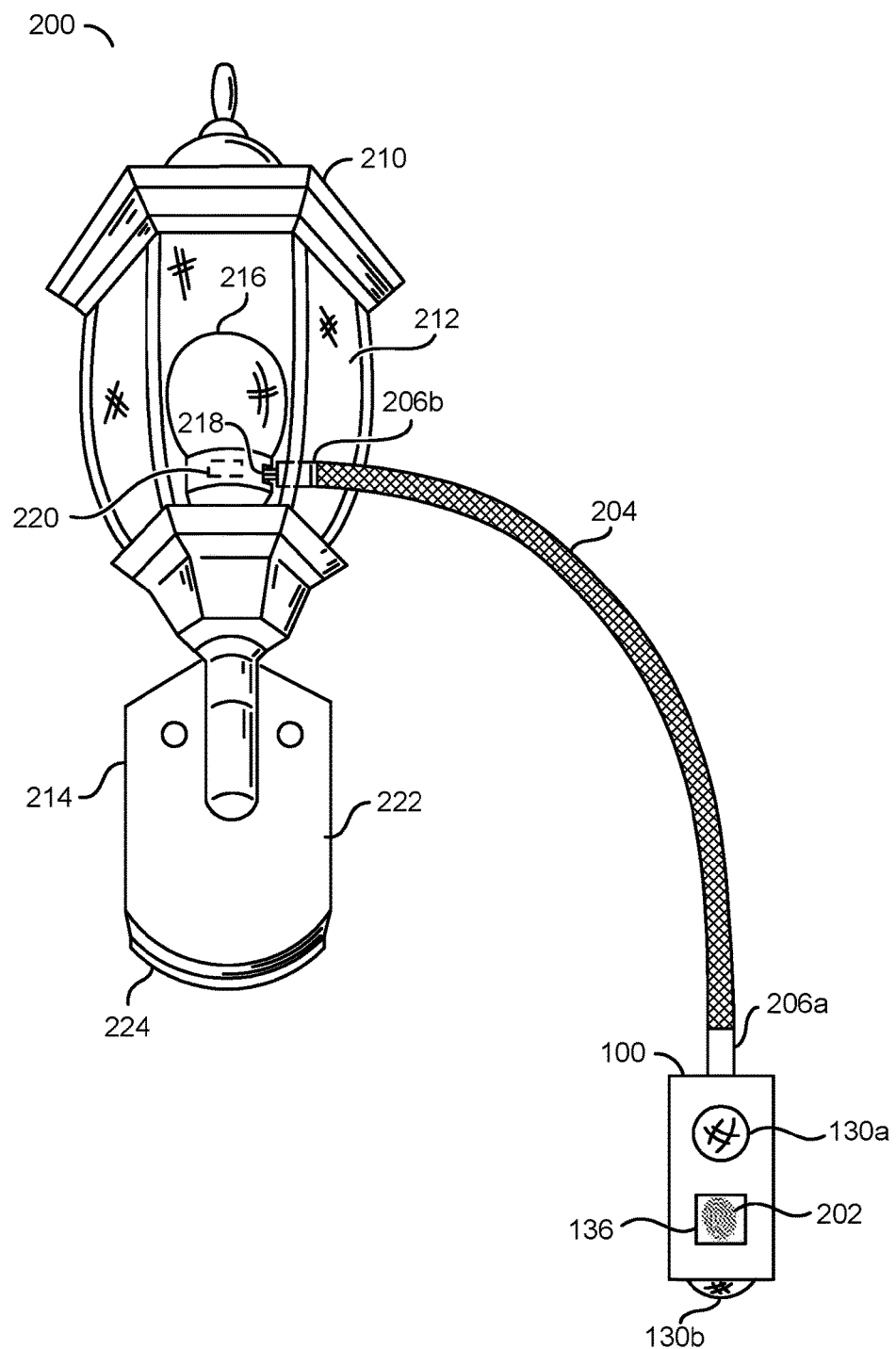
FIG. 4 is a diagram illustrating receiving a power supply from a light bulb adapter.

Referring to FIG. 4, a diagram illustrating the apparatus 100 receiving a power supply from a light bulb adapter is shown. In some embodiments, the apparatus 100 may be battery powered. In some embodiments, the apparatus 100 may be powered using a connection to doorbell wiring (e.g., a power supplied from the premises). In some embodiments, the apparatus 100 may receive power via a DC connection (e.g., a USB connection). In an example, the apparatus 100 may receive power from a light bulb socket adapter configured to provide DC power using a power adapter to convert AC power to DC.

An example context 200 is shown. In the example context 200, the apparatus 100 may implement a smart doorbell. The smart doorbell 100 may be mounted to a wall. A front view of the apparatus 100 is shown. The lens 130a is shown on the front of the apparatus 100 and the lens 130b is shown on a bottom side of the apparatus 100. The button 136 is shown below the lens 130a on the front of the apparatus 100.

In some embodiments, the button 136 on the apparatus 100 may comprise a fingerprint detector 202. A fingerprint of the visitor 170 may be captured by the fingerprint detector (or scanner) 202 when the visitor 170 presses the button 136 to activate the doorbell 100. The fingerprint scanner 202 may provide pre-screening and/or identification of the visitor 170. For example, known visitors (e.g., friends, family, repeated guests, etc.) may be identified based on the fingerprint of the visitor 170. The companion application may 160 enable customized responses based on visitor profiles. The visitor profile may comprise the fingerprint to associate the detected visitor with the visitor profile. In some embodiments, the fingerprint scans used to associate the fingerprint detected by the fingerprint scanner 202 may be stored on the apparatus 100 (e.g., by a memory component of the circuit 104). In some embodiments, the fingerprints detected by the fingerprint scanner 202 may be communicated wirelessly to a remote device (e.g., a cloud computing service, a database, a computer, etc.) to determine the identity of the visitor 170 and provide the information in the visitor profile.

When the visitor 170 is detected using the fingerprint scanner 202 (or using other detection methods such as video analysis to perform facial recognition by the video processor 106), one type of notification may be presented to the user device 120 if the visitor 170 is identified within the visitor profile database. In some embodiments, emergency services may provide databases of known criminals and/or other people of interest (e.g., missing persons, suspects, etc.).

In the example context 200, the apparatus 100 is shown connected to a cable 204. The cable 204 may have a connector 206a at one end to connect to the apparatus 100. The cable 204 may have a connector 206b to connect to another device. The cable 204 may be configured to transmit data and/or power. In an example, the cable 204 may be a USB type cable. The type of cable implemented may be varied according to the design criteria of a particular implementation.

In the example context 200, the cable 204 may connect a smart light 210. The smart light 210 may comprise a lamp shade (or light sconce) 212 and/or a universal base 214. A light bulb 216 may be within the lamp shade 212. The cable connector 206b may connect to a port 218 of the light bulb 216. In the example shown, the light bulb 216 may comprise a base implementing a power adapter 220 and the port 218. In some embodiments, the light bulb may connect to a universal base implementing the power adapter 220 and the port 218. In an example, the light bulb 216 may be controlled by the companion application 160 using the control 164f (e.g., a signal to control the light bulb 216 may be transmitted from the apparatus 100 to the light bulb 216 via the cable 204).

In some embodiments, the power adapter 220 may be configured to receive an AC power supply (e.g., from a power source of the premises). For example, the power adapter 220 may provide the AC power to the light bulb 216. The power adapter 220 may further be configured to generate a DC power supply from the AC power. In one example, the DC power generated by the power adapter 220 may be used to provide DC power to the apparatus 100 via the cable 204. For example, the light bulb 216 may be located within a range of the length of the cable 204 (e.g., approximately 20 feet) to provide the power supply from the port 218.

In the example shown, the base 214 may comprise a faceplate 222 and/or a seal 224. The faceplate 222 may be used to cover an electrical junction box that may be a source of the AC power supply. In the example shown, the base 214 and/or the apparatus 100 may be located below the light sconce 212. The apparatus 100 may be located anywhere within the length of the cable 204 to provide flexibility of placement of the apparatus 100. In an example, the apparatus 100 may be located above, below, and/or to either side of the light fixture 210 and/or the lamp shade 212. In another example, the location of the apparatus 100 may be selected to provide a desired (e.g., optimal) viewing angle and/or field of view for the lenses 130a-130b. In yet another example, the location of the apparatus 100 may be placed in an obscure location (e.g., close to a roof overhang and/or an eaves trough). In the example of the apparatus 100 implementing a doorbell, the apparatus 100 may be located at approximately chest or waist height (e.g., standard doorbell height). The location of the apparatus 100 may be varied according to the design criteria of a particular implementation.

In the example shown, the cable 204 is visible for illustrative purposes. However, when installed on the premises, the cable 204 may be hidden and/or protected. In one example, an armored tube and/or a weatherproofed tube may be implemented to house the cable 204. Implementing the weatherproofed tube may protect the cable 204 from physical damage, prevent water from reaching the cable 204 and/or meet local electrical standards.

Figure 5:
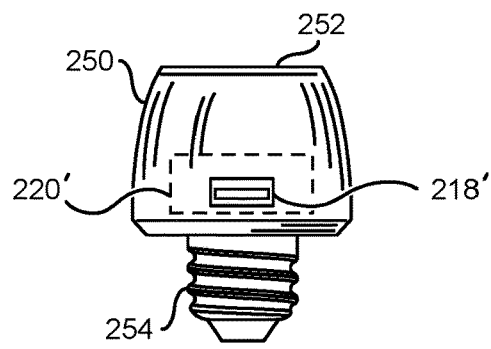
FIG. 5 is a diagram illustrating an example socket adapter.

Referring to FIG. 5, a smart socket adapter 250 is shown having the power adapter 220'. In some embodiments, the smart socket adapter 250 may be implemented in the light fixture shown in association with FIG. 4. Implementing the smart socket adapter 250 may provide the DC power to the apparatus 100 via the port 218' for the cable 204 using the power adapter 220' while using a standard light bulb in the light fixture 210.

The smart socket 250 may comprise a connector 254. The connector 254 may be implemented as a screw-in base. The connector 254 may have similar implementation as a screw-in base for standard light bulbs. The connector 254 may receive an AC power supply from an electrical connection to the light fixture 210. In one example, the connector 254 may be a connector for an E26 socket. The size of the screw-in-base 254 may be varied according to the criteria of a particular implementation. For example, the connector 254 may be a male connector for a female receptacle in the light fixture 210.

The smart socket 250 may comprise an adapter connector 252. The adapter connector 252 may be implemented as a screw-in socket adapter. The socket adapter 252 may have a similar implementation as a screw-in base for standard light bulbs. The adapter connector 252 may pass through the AC power supply to a standard light bulb. For example, the adapter connector 252 may implement an E26 socket. The size of the screw-in-base adapter 252 may be varied according to the criteria of a particular implementation. For example, the adapter connector 252 may be a female socket for a male connector of the standard light bulb.

Another alternate location for the power adapter 220' is in the light bulb socket 250. Implementing the power adapter 220' in the smart socket adapter 250 may avoid a need for wiring high voltage AC wires and/or connecting doorbell wiring from the premises for the apparatus 100 (e.g., enable the apparatus 100 to be installed at a location other than the pre-determined doorbell location for a home).

The connector 254 may use an electrical connection to receive the AC power supply from the light fixture 210, similar to a standard light bulb implementation. The smart socket adapter 250 may pass the AC power supply received by the connector 254 through to the adapter connector 252. The adapter connector 252 may provide the AC power supply to the standard light bulb. The power adapter 220' may convert the AC power supply to a low voltage (e.g., DC) power supply. The power adapter 220' may present the low voltage power supply to the port 218'.

Figure 6:
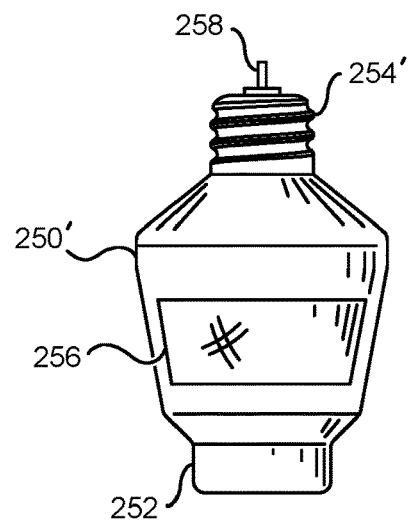
FIG. 6 is a diagram illustrating an alternate embodiment of a socket adapter with a spring loaded contact.

Referring to FIG. 6, an alternate embodiment of the smart socket adapter 250' is shown. In some embodiments, the smart socket adapter 250' may comprise a module 256. The module 256 may be a wireless communications module (e.g., implementing communication protocols for Wi-Fi, Bluetooth, ZigBee, etc.). In an example, the communication module 256 may be configured to implement a wireless connection to receive control signals from the apparatus 100 (e.g., transmitted by the wireless communications module 108). The control signals may be configured to control the light bulb (e.g., turn the light bulb on/off, control an intensity of the light bulb, adjust a color of the light bulb, adjust a frequency of the light bulb, etc.). In another example, the communication module 256 may be configured to send data to the wireless communications module 108 of the apparatus 100 (e.g., to provide a status of the light bulb 80 such as whether the light is on or off).

In some embodiments, the communication module 256 may be implemented for the smart socket adapter 250' instead of the port 218'. In some embodiments, the communication module 256 may be implemented in addition to the port 218' (e.g., the port 218' may be implemented to provide a DC power supply and the communication module 256 may be used for the communication of the control signals with the apparatus 100). The communication protocol(s) implemented by and/or the type of data transmitted using the communication module 256 may be varied according to the design criteria of a particular implementation.

The smart socket adapter 250' may be implemented with a spring loaded contact 258. Generally, light fixtures are designed to have the light bulb centered with respect to the lamp shade 210. The socket adapter 250' may be configured to limit an amount of extra height (e.g., a height of 12 mm) caused by installing the socket adapter 250'. The spring loaded contact 258 may be implemented on the connector 254'. The spring loaded contact 258 may be implemented to allow the smart socket adapter 250' to orient the port 218' at any angle and maintain a connection to the cable 204.

Figure 7:
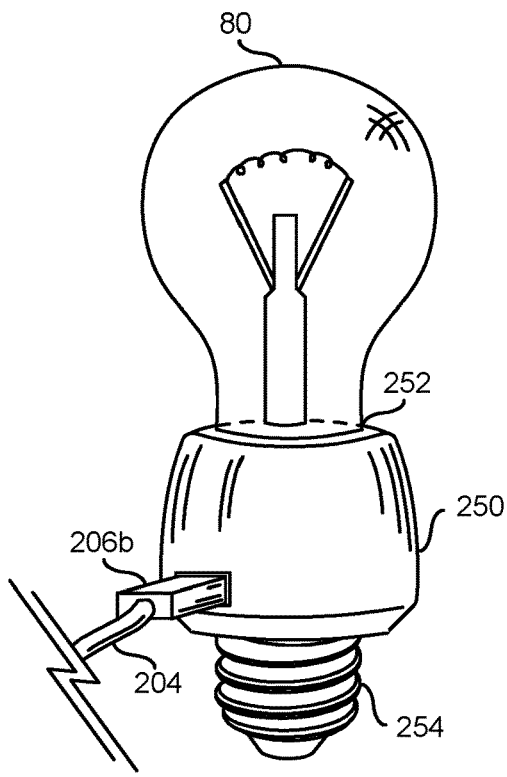
FIG. 7 is a diagram illustrating an example embodiment of a socket adapter with a light bulb.

Referring to FIG. 7, an example embodiment of the socket adapter 84 is shown connected to a standard light bulb 80. The connector 206b (e.g., a USB cable) is shown plugged into the port 218. The light bulb 80 is shown connected to the adapter connector 252. In one example, the light bulb 80 may be implemented as an incandescent light bulb. In another example, the light bulb 80 may be implemented as a LED light bulb.

Connecting the light bulb 80 to the smart socket adapter 250 may increase an amount of space occupied by the light bulb 80. For example, the height of the smart socket adapter 250 may be added to the height of the light bulb 80. The height of the smart socket adapter 250 may be constrained to a size of the male connector of the light bulb 80.

Figure 8:
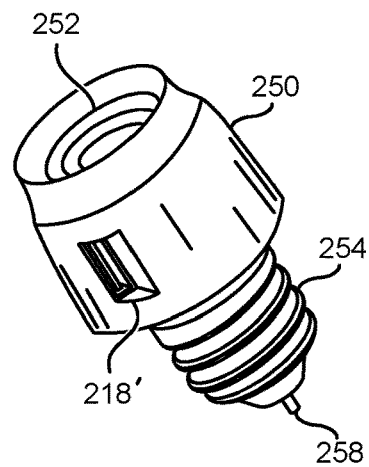
FIG. 8 is a diagram illustrating an alternate view of a socket adapter with an inset port.

Referring to FIG. 8, an alternate view of the socket adapter 250 with an inset port is shown. The port 218' is shown partially inset on the smart socket adapter 250. Arranging the port 218' to be inset may allow the connector 206 to connect relatively flat against a side of the socket adapter 250 (e.g., prevent the connector 206b from sticking out). The alternate view shows the female socket on an inner portion of adapter connector 252. In one example, the inner portion of the adapter connector 252 may be threaded to accept the threading of the male connector of the light bulb 80. In another example, the inner portion of the adapter connector 252 may be a cavity for accepting male prong connectors of the light bulb 80. The type of adapter connector 252 implemented may be varied according to the design criteria of a particular implementation.

Figure 9:
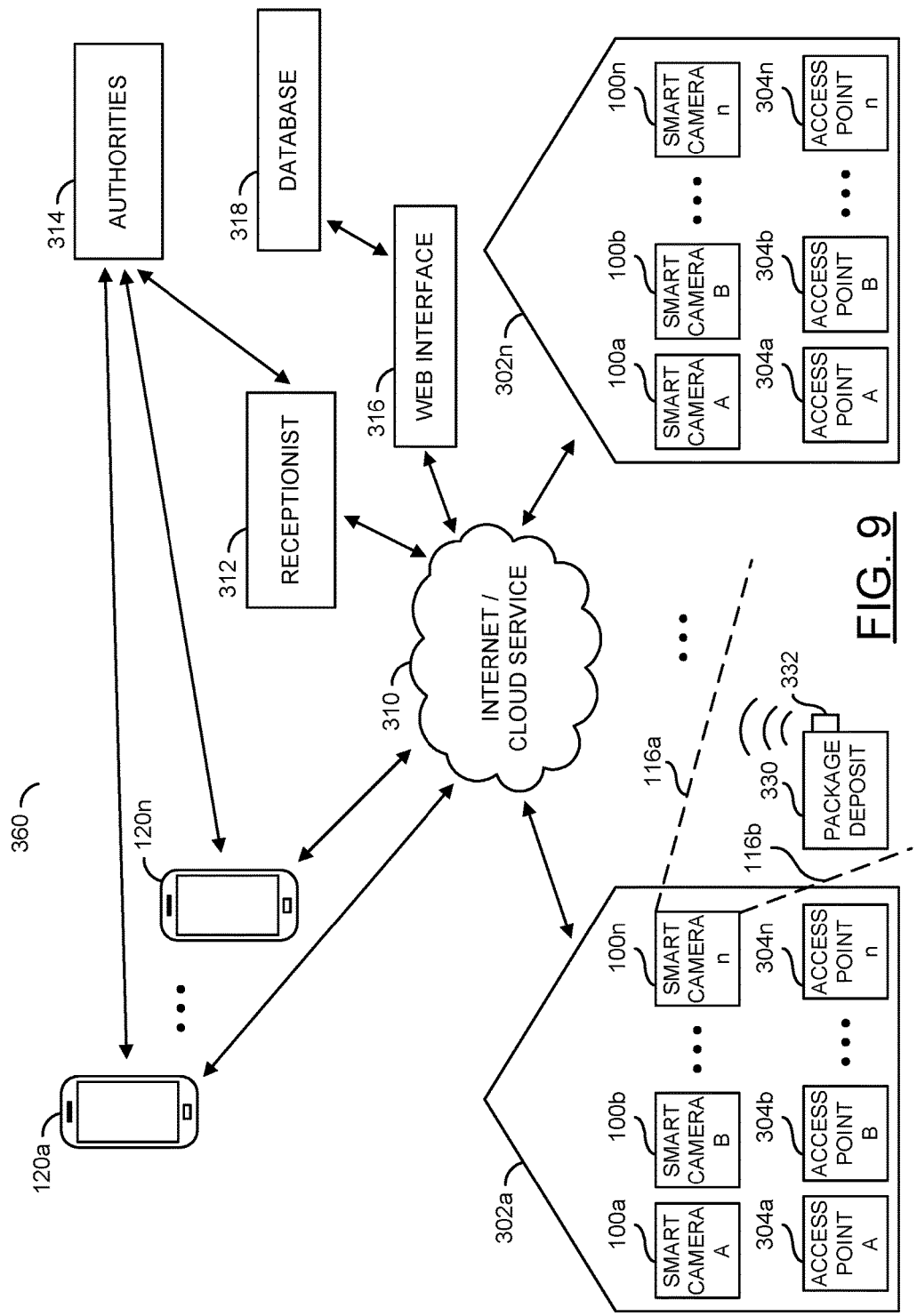
FIG. 9 is a diagram illustrating an example cloud-based security system.

Referring to FIG. 9, a diagram illustrating an example cloud-based security system 300 is shown. The system 300 generally comprises blocks 302a-302n. The blocks 302a-302n may be homes and/or business premises. Each of the homes 302a-302n may comprise blocks 304a-304n. The blocks 304a-304n may be areas of interest (e.g., access points to the homes and/or business premises 302a-302n). The smart cameras (e.g., doorbells) 100a-100n may be set up at each of the areas of interest 304a-304n of the homes and/or business premises 302a-302n. For example, the smart cameras 100a-100n may be configured to monitor the areas of interest 304a-304n.

The system 300 may further comprise the internet and/or cloud service 310, a receptionist 312, authorities 314, a web interface 316, a database 318 and/or the smartphones 120a-120n. In one example, the receptionist 312 may be a virtual receptionist. In another example, the receptionist 312 may be a person from a central monitoring service. In one example, the authorities 314 may be the police department, the fire department, an ambulance, and/or other emergency services.

The areas of interest 304a-304n may be doors, windows, garages, other entrances, and/or vantage points. Generally, the smart cameras 100a-100n may be mounted at the areas of interest 304a-304n. Data from the smart cameras 100a-100n at the homes and/or business premises 302a-302n may be sent to the Internet and/or cloud service 310.

Data sent to the internet and/or cloud service 310 may be sent to the user devices 120a-120n. For example, an alert from one of the smart cameras 100a-100n from the home 302a may be sent to the device 120a of the homeowner indicating that another family member has arrived home. In another example, an alert from one of the smart cameras 100a-100n from the home 302n may be sent to the smartphone 120c of an owner of another home (e.g., the owner of the home 302b) that a suspicious person has been identified in the neighborhood. A user may then send a notification to the authorities 314. In yet another example, the device 120a may receive an alert from one of the smart cameras 100a-100n indicating that the package 180 has been delivered. A user of the user devices 120a-120n may send data back to the smart cameras 100a-100n of the homes and/or business premises 302a-302n through the Internet and/or cloud service 310. In one example, the homeowner 62 may send a command to arm an alarm (e.g., one of the security responses) at their home.

In one example, the user devices 120a-120n may be in the possession of trusted volunteers. The trusted volunteers may be other home owners in the system 300. The trusted volunteers may be the first line of response to a security issue detected by the system 300. Alerts by the system 300 may be sent in parallel to all the trusted volunteers. The trusted volunteers may use available communication channels provided such as cell phones, telephone and/or emails. The homeowner may advise particular pre-defined responses to particular alerts such as calling the authorities 314 (e.g., the police and/or the fire department). The trusted volunteers may be able to activate a set of pre-defined actions using the user devices 120a-120n. The trusted volunteers may take training sessions to learn how to properly respond to various alerts. The training sessions may be taken on-line. The on-line training sessions may be available on the web interface 316 and/or using the companion application 160. For example, the web interface 316 may be used to access the companion application 160 via a desktop computer and/or smart TV.

If the network of trusted neighbors 302a-302n has the same system, they may exchange images, video, and/or other information of unwelcomed visitors. The website and/or web interface 316 may have the database 318 to manage the images, video, and/or other information. Unwelcome visitors stored in the database 318 may be shared with other neighbors and/or the authorities 314 using the web interface 316. For example, when the unwelcomed visitors learn about the database 318 they may not target the neighborhood 302a-302n. Data in the database 318 may be used to classify types of visitors (e.g., comparisons may be performed between the captured video data and information in the database 318).

Multiple levels of alerts may be implemented to distinguish unwelcomed visitors from welcomed visitors (e.g., household members). Since most visitors may be welcomed, identifying strangers and raising the level of alert for immediate attention may be important. The technology to identify and/or classify welcomed visitors may include facial recognition, voice recognition, machine learning of habits and schedules of household members, and/or user inputs when errors occur. Learned behavior may be used to determine which pre-defined function to perform. For example, the learned behavior may determine that nobody is home at a particular time, and the pre-defined function may be to automatically arm the security system and/or perform energy saving functions (e.g., adjust the heating and/or cooling of a home). In another example, the daily schedule of inhabitants may be observed and/or recorded. The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. If nobody is home, the system 300 may determine that exterior lighting is needed and/or interior lighting is not needed. In another example, if a family is on vacation the system may turn on interior lighting to make it appear to a potential burglar that the home is occupied. The learned behavior may develop a unified status of the home (e.g., based on occupancy, time of day, weather, security status, etc.). Pre-defined functions may be performed based on the unified status of the home.

In some embodiments, the smart cameras 100a-100n may initiate storage of the video data (e.g., the video streams 162a-162b) in response to motion detection in the area of interest. The user device 120a (e.g., a smart phone) may be used to allow a user to set a motion threshold for each of the smart cameras 100a-100n. For example, a lower motion threshold may be more sensitive to motion. In another example, a higher motion threshold may be less sensitive to motion (e.g., reduce a number of false positives). The motion threshold may be adjustable.

In some embodiments, the smart cameras 100a-100n may initiate storage of the video data (e.g., VS1-VS2) in response to detecting and/or locating a person (e.g., the visitor 170) and/or other type of object (e.g., the car 172) in the video data. In one example, the video processor 106 of the smart cameras 100a-100n may analyze the video data to detect people and/or animals. In some embodiments, facial recognition may be implemented to classify and/or recognize visitors. The activation state may be selected based on the classification. In some embodiments, the video data may be analyzed to determine a behavior of the visitors.

In some embodiments, machine learning techniques may be implemented to improve detection and/or classification accuracy of visitors and/or objects. For example, the user may be able to provide a correct and/or incorrect label to a detection performed by the smart cameras 100a-100n. If the detection and/or classification is incorrect, the incorrect label may be used by the smart cameras 100a-100n to incorporate an incorrect result of the detection into the machine learning techniques. In some embodiments, the machine learning techniques may be implemented in the cloud service (e.g., the analysis is performed using cloud computing resources configured to scale available resources on demand). Video data and/or correct/incorrect labels may be uploaded and/or stored anonymously (e.g., without personal identification information). The smart cameras 100a-100n may be configured to ignore (e.g., not respond to, not track and/or not send notifications in response to) small animals and/or shadows.

In some embodiments, the smart security cameras 100a-100n may be configured to send notifications to the user devices 120a-120n in response to the detection. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user 62 may create a user account (e.g., comprising at least an email address and a password as credentials) for the cloud service (e.g., using the companion application 160 and/or the web-based interface 316). The user account may allow the user to configure preferences. The preferences may comprise the notification settings. The type of notifications sent by the smart cameras 100a-100n may be based on the notification settings. The smart cameras 100a-100n may implement the activation states and/or arm/disarm the security responses to limit a number of the notifications sent. Intelligently limiting the number of notifications sent may reduce a number of false alarms and/or reduce an amount of data transferred via the network 310 (e.g., prevent QoS issues and/or dropped data).

The cloud service 310 and/or the database 318 may store portions of the video data VS1-VS2 from each of the smart cameras 100a-100n. For example, portions of the video data may be saved in response to the particular types of detections. The portions of video data may be video clips. The video clips may be encoded and/or compressed by the video processor 106 to reduce a size of storage capacity of the video clips. The video clips may have a limited video length (e.g., 30 seconds, one minute, 90 seconds, five minutes, etc.). The length of the video clips may be based on the configuration preferences and/or in response to the detections by the smart cameras 100a-100n (e.g., a longer video clip may result in response to continuous detections). In some embodiments, the video clips may be pre-padded and/or post-padded with video data before and/or after the detection. For example, the video clip may store video data from a pre-determined time before and/or after the detection (e.g., 30 seconds before the detection and/or 30 seconds after the detection for a video clip approximately one minute long).

In some embodiments, a user interface may be provided for the user devices 120a-120n (e.g., the companion application 160, an executable program, the web-based interface 316, etc.). The user interface may allow one or more of the user devices 120a-120n to control various components of the smart cameras 100a-100n. For example, one or more user devices 120a-120n may be configured to access the user account. The control signals may be generated in response to the input from the user devices 120a-120n. For example, an icon may be provided on the user interface representing a light bulb (e.g., the control 164f). The user 62 may activate and/or deactivate the light bulb 80 by pressing (touching on a touchscreen, clicking, etc.) the icon 164f.

Other components such as security response components may be turned on and/or off from the user interface 160. For example, the icon 164d may be provided to allow the user to control the speaker of one or more of the smart cameras 100a-100n. In one example, the speaker of the smart cameras may playback a pre-recorded audio message (e.g., the user 62 may select from one or more pre-recorded audio messages on the user interface). In another example, the speaker of the smart cameras 100a-100n may sound an alarm (e.g., one or more alarm types may be selected from the user interface 160).

In some embodiments, the smart cameras 100a-100n may be configured for two-way audio communications (e.g., an intercom). For example, the voice of a visitor may be received using a microphone component of the circuit 104. The circuit 104 may receive the audio data via the microphone. The communication module 108 may transmit the received audio to one or more of the user devices 120a-120n. The user devices 120a-120n may playback the audio to the user 62. The user 62 may speak via the microphone 154 on the user devices 120a-120n. The user devices 120a-120n may transmit the audio to one or more of the smart cameras 100a-100n (e.g., the user 62 may select which of the smart cameras 100a-100n to playback the audio using the companion application 160) via the communication module 108 (e.g., a Wi-Fi connection). The speaker component of the apparatus 100 may transmit and/or stream the received audio.

The smart cameras 100a-100n may provide various APIs (application programming interface) to connect with other devices (e.g., other home automation devices). For example, the APIs may allow various other devices to communicate with the smart cameras 100a-100n. In one example, the companion application 160 may be configured to receive/transmit data between the apparatus 100 and/or other smart devices (e.g., the smart security light 210). For example, the smart cameras 100a-100n and/or a number of smart security lights 210 (e.g., comprising similar video processing capabilities as the smart cameras 100a-100n) may provide a smart home security system. The smart cameras 100a-100n may generate control signals based on the communication with the various devices other devices. The types of APIs available may be varied according to the design criteria of a particular implementation.

A package deposit 330 is shown at the home 302a. The package deposit 330 may be implemented to allow the visitor 170 to deliver packages (e.g., the package 180). The package deposit 330 may be implemented as a container, a bag, a delivery slot, a mailbox, etc. In an example, the package deposit 330 may be implemented as a large net with a zipper and a lock. A delivery person may be instructed by the smart security cameras 100a-100n to place a package inside the package deposit 330 and zip up and/or lock the package deposit 330. In some embodiments, the package deposit 330 may implement a hazardous waste storage (e.g., medical waste for a medical facility) and the package deposit 330 may be monitored to ensure proper disposal of materials in the package deposit 330 (e.g., the package deposit 330 may be implemented for package pick-up). The implementation of the package deposit 330 may be varied according to the design criteria of a particular implementation.

A wireless device 332 is shown on the package deposit 330. The wireless device 332 may be configured to transmit wireless signals to indicate a status of the package deposit 330. In an example, the wireless device 332 may send a notification to the smart cameras 100a-100n indicating that the package has been delivered. In another example, the wireless device 332 may be configured to send a notification to the smart security cameras 100a-100n indicating that the package deposit 330 has been tampered with. The smart cameras 100a-100n may forward the notification to one or more of the user devices 120a-120n. The type of notifications transmitted by the wireless device 332 may be varied according to the design criteria of a particular implementation.

The smart security cameras 100a-100n may be configured to adjust an activation state in response to the package 180 being delivered and/or picked up (e.g., in response to the notification from the wireless device 332). A security zone is shown in the field of view 116a-116b (e.g., the field of view of the lens 130b of the apparatus 100n). The smart security camera 100n may monitor the security zone within the field of view 116a-116n near the package deposit 330. In an example, when the security zone 116a-116n is invaded (e.g., by a visitor such as a potential package thief) the smart camera 100n may be configured to perform a security response (e.g., activate an alarm, send an alert to a designated user, etc.). The security zone 116a-116n may be the area of interest 118b below the apparatus 100n. In some embodiments, the capture device 102b may be configured to capture package information about the delivered package 180 (e.g., a bar code, a tracking number, an identification of the delivery person, etc.).

Figure 10:
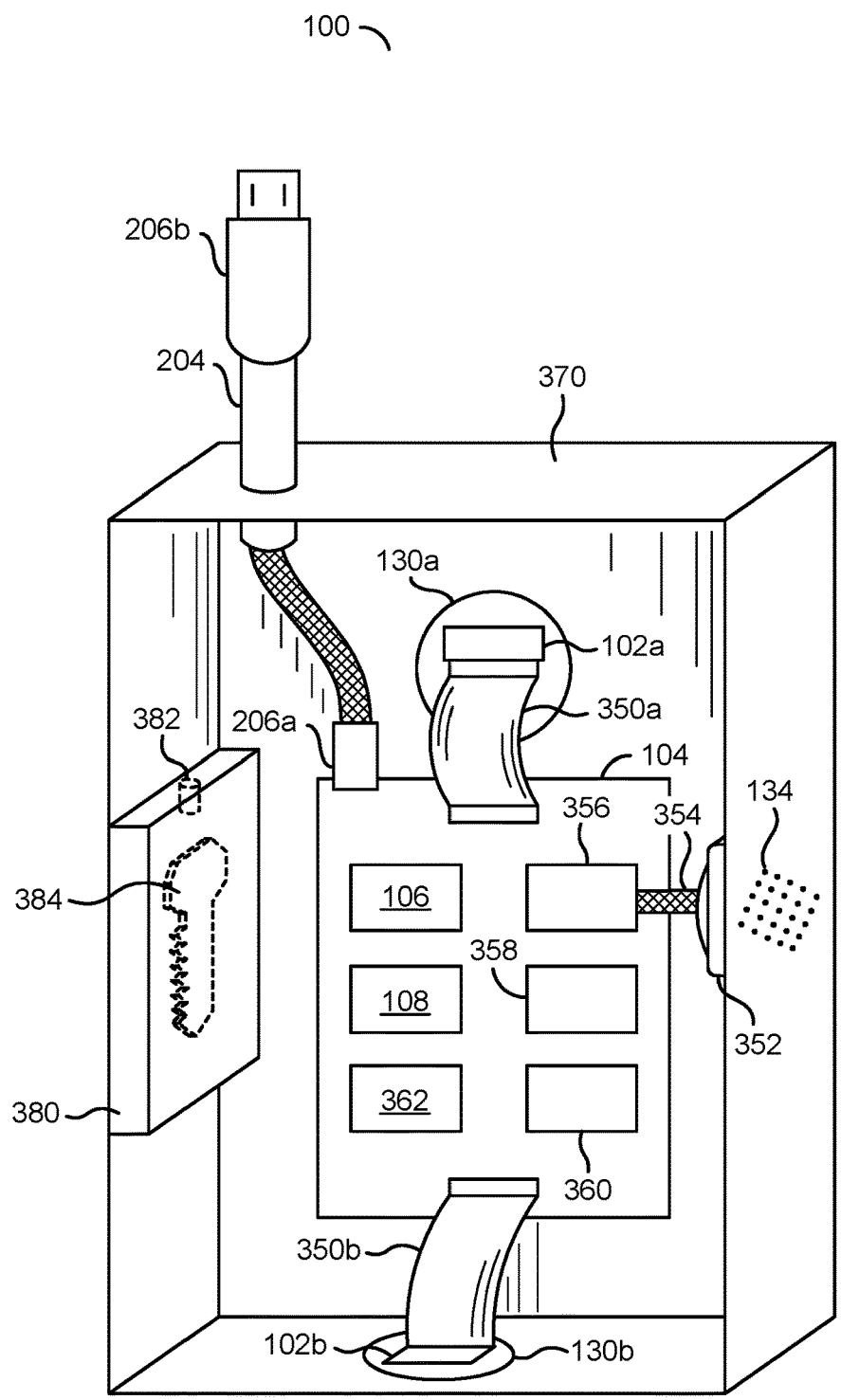
FIG. 10 is a diagram illustrating a rear view of the internal components of an exemplary embodiment of the invention.

Referring to FIG. 10, a diagram illustrating a rear view of the internal components of an exemplary embodiment of the apparatus 100 is shown. The apparatus 100 may comprise the circuit board 104. The circuit board 104 may comprise a number of components and/or connectors. The video processor 106 and the communication device 108 are shown on the circuit 108 along with other components. An illustrative example of the various components and/or connectors is shown. The number, type and/or arrangement of the components and/or connectors may be varied according to the design criteria of a particular implementation.

Connectors 350a-350b are shown. The connectors 350a-350b may be implemented as ribbon-type connectors. The connector 350a is shown connecting the capture device 102a to the circuit 104. The connector 350b is shown connecting the capture device 102b to the circuit 104. The connectors 350a-350b may be configured to provide a high-speed video data link between the capture devices 102a-102b to the video processor 106 on the circuit 104. The high-speed video data transmission link may enable real-time video processing and/or video analysis to generate the video streams VS1-VS2 from the captured video frames 110a-110n and/or 112a-112n. For example data captured by the image sensors of the capture devices 102a-102b may be presented to the video processor 106 and/or video processors via the connectors 350a-350b to enable the video processor 106 and/or processors to process, analyze, compress and/or package the video for streaming/recording.

A speaker 352 is shown. The speaker 352 is shown mounted within the apparatus 100 next to the speaker grille 134. The speaker grille 134 may provide an opening to enable the audio generated by the speaker 352 to be transmitted outside of the apparatus 100. A connector 354 is shown connecting the speaker 354 to the circuit 104.

In the example shown, the circuit 104 may comprise the video processor 106, the communication device 108, a block (or circuit) 356, a block (or circuit) 358, a block (or circuit) 360 and/or a block (or circuit) 362. The circuit 356 may implement an audio processing component. The circuit 358 may implement a microphone component. The circuit 360 may implement a storage component. The circuit 362 may implement a power storage and/or conversion component. The circuit 104 may comprise other components (not shown).

The audio processing component 356 may be configured to encode, decode and/or play back audio. In an example, the audio processing component 356 may be configured to play back pre-recorded audio stored in the storage component 360 (e.g., pre-recorded greetings, alarms, music, etc.). In another example, the audio processing component 356 may be configured to play back audio received from the user device 120 in real-time.

The microphone component 358 may be configured to receive audio data (e.g., from the visitor 170). In one example, the microphone component 358 may capture the audio input and present the audio input to the communication device 108 for streaming to the user device 120. In another example, the microphone 358 may capture the audio input and present the audio input to the audio processing component 356 for encoding (e.g., to be stored by the storage component).

The storage component 360 may be configured to store computer readable data. In one example, the storage component 360 may be a non-volatile storage medium. In another example, the storage component 360 may be a combination of non-volatile and volatile memory. The storage component 360 may store audio data (e.g., the pre-recorded audio for playback, the received audio), video data (e.g., the video streams VS1-VS2), computer readable instructions and/or other data.

The power storage and/or adapter component 362 may be configured to receive and/or supply power to the components of the apparatus 100. In one example, the power storage component 362 may be a battery (e.g., rechargeable) configured to supply power to the circuit 104 (e.g., the apparatus 100 may comprise a solar panel for capturing energy to recharge the battery). In another example, the power storage and/or adapter component 362 may be configured to convert an AC power supply to DC power usable by the circuit 104. In yet another example, the power storage and/or adapter component 362 may be configured to regulate power provided to the apparatus 100.

In the example shown, the connector 206a is shown as a port to the circuit board 104. The port 206a may be a USB connector configured to provide power to the apparatus 100. The power adapter component 362 may be configured to regulate and/or store the power received via the connector 206a. In some embodiments, the port 206a may enable data communication (e.g., for firmware upgrades, for configuration, etc.).

The circuit 104 and/or the capture devices 102a-102b are shown within a housing 370 of the apparatus 100. In one example, the housing 370 may be a plastic material. In another example, the housing 370 may be a weatherproofed material configured to operate in outdoor conditions (e.g., rain, snow, heat, etc.). The type of housing implemented may be varied according to the design criteria of a particular implementation.

A compartment 380 is shown. The compartment 380 may be hollow. The compartment may have a lock/latch 382. In the example shown, the compartment 380 may contain a key 384. For example, the key 384 may be used to gain entry to the premises 302a. The size, location and/or type of objects stored in the compartment 380 may be varied according to the design criteria of a particular implementation.

The latch 382 may be controlled by the circuit 104. For example, the circuit 104 may enable the latch 382 to remotely lock/unlock the compartment 380. In an example, the companion application 160 may provide an option to unlock the latch 382 (e.g., a homeowner may receive a notification that a delivery person has arrived with the package 180 and may remotely unlock the compartment 380 to allow the delivery person to access the key 384 to drop off the package 180 in the home). In another example, the video processor 106 may perform facial recognition to identify the visitor 170. If the visitor 170 is recognized as a person that may enter the premises 302a (e.g., a neighbor checking on a home while the homeowners are on vacation), the circuit 104 may unlock the latch 382 to enable the visitor 170 to use the key 384.

Figure 11:
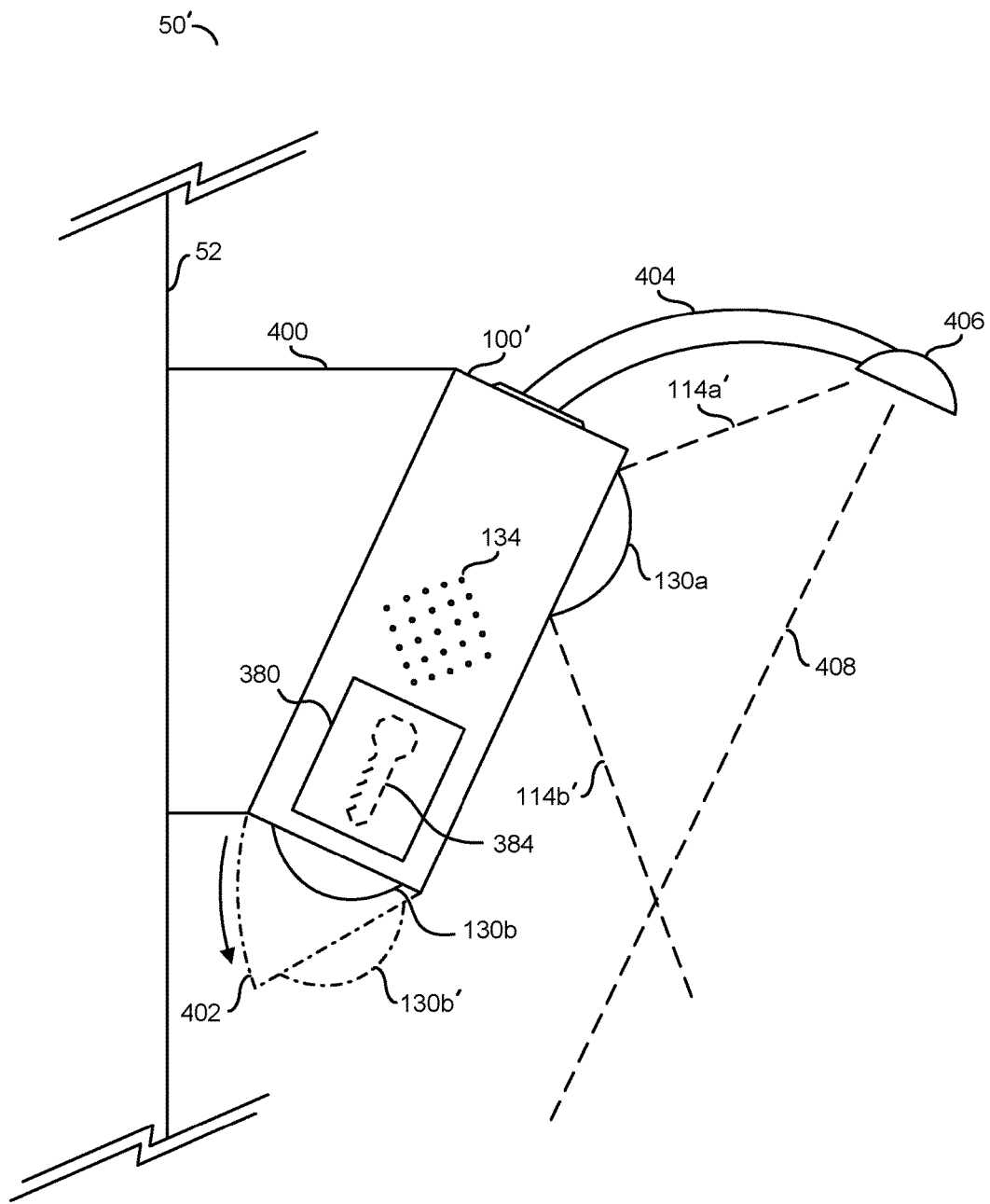
FIG. 11 is a diagram illustrating a wedge attachment to change a viewing angle of the capture devices.

Referring to FIG. 11, a diagram illustrating a context 50 of the apparatus 100' implementing a wedge attachment to change a viewing angle of the capture devices 102a-102b is shown. The apparatus 100' is shown attached to a wedge 400. The wedge 400 may be attached to the wall 52. The wedge 400 may be used to adjust the angle of the fields of the view of the capture devices 102a-102b. In the example shown, the wedge 400 may direct the apparatus 100' downwards providing a lower angle point of view for the front facing lens 130a and providing more viewing area behind the apparatus 100' for the lens 130b. In another example, the wedge 400 may be angled to direct the apparatus 100' to provide an upward angle for the field of view of the lens 130a. In some embodiments, the wedge 400 may provide an adhesive to attach to the apparatus 100' and/or the wall 52. In some embodiments, the wedge 400 may comprise female slots and/or bayonet mounts for connecting to the wall 52 and/or the apparatus 100'. The implementation of the wedge 400 may be varied according to the design criteria of a particular implementation.

In the example shown, the apparatus 100' may have the compartment 380. The compartment 380 is shown on the side of the apparatus 100'. The compartment 380 may be unlocked remotely to enable the visitor 170 to grab the key 384, if the visitor 170 is given permission (e.g., by facial recognition performed by the processor 106, by the user 62 providing access using the companion application 160, using the fingerprint scanner 202, etc.).

In some embodiments, the lenses 130a-130b may be adjustable. In the example shown, the bottom of the apparatus 100' may be configured to swivel to move the lens 130b. A swivel portion 402 is shown sliding out of the apparatus 100'. The swivel portion 402 may slide and/or collapse into the apparatus 100'. For example, the lens 130b may adjust from a position directly below the apparatus 100' (e.g., when the swivel portion 402 is within the apparatus 100') to a position angled more towards the front of the apparatus 100' (e.g., as shown by the lens 130b'). For example, the bottom of the apparatus 100' may slide outwards to change the field of view of the lens 130b.

In some embodiments, the apparatus 100' may comprise an attachment 404. The attachment 404 may be a rigidly flexible component. For example, the attachment 404 may be configured to be moved, positioned and/or shaped and retain the new shape. In the example shown, the attachment 404 is on a top portion of the apparatus 100'. However, the attachment 404 may be located anywhere on the apparatus 100'. In an example, the attachment 404 may be removably attached to the apparatus 100'.

An attachment end 406 is shown at the end of the attachment 404. In one example, the attachment end 404 may be a light source. For example, the attachment 404 may be configured to provide power to the light source 404. In another example, the attachment end 406 may be a mirror and/or prism.

The mirror and/or prisms 406 may be configured to adjust the field of view of the lenses 130a-130b. In the example shown, the lens 130a may have the field of view 114a'-114b'. The mirror 406 may be attached to the flexible attachment connector 404 to adjust the field of view 114a'-114b' of the front facing lens 130b. A line 408 is shown. The mirror 406 may be angled to adjust the field of view to include the reflection 408. For example, the mirror 406 may be used to provide the field of view 114a'-114b' and the reflection 408 behind and/or below the apparatus 100'. In some embodiments, the prism may be implemented to enable one capture device to capture multiple and different fields of view.

Figure 12:
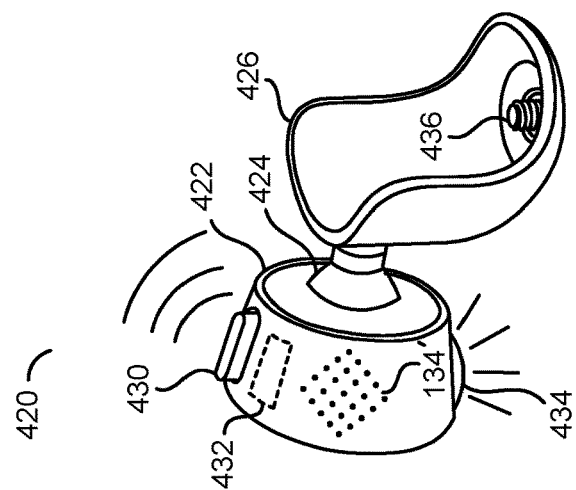
FIG. 12 is a diagram illustrating a secure flexible mount.

Referring to FIG. 12, a diagram illustrating a secure flexible mount embodiment 420 is shown. The flexible mount embodiment 420 may comprise a base 422, a flexible joint 424 and/or a mount (or holder) 426. The flexible mount embodiment 420 may be an accessory for the apparatus 100.

The apparatus 100 may securely attach to the mount embodiment 420. The mount embodiment 420 may have the base 422 for attachment to a surface (e.g., a wall). The base 422 may comprise a high-quality speaker (e.g., of better quality than the speaker 352 on the apparatus 100). For example, the speaker grille 134' is shown on the base 422. The base 422 may comprise a wireless communication component (e.g., Wi-Fi, Bluetooth, cellular, etc.) 430. The base may comprise a light and/or IR sensor 434 to improve video captured at night.

The base 422 may comprise a hollow compartment 432 for holding a key. The hollow compartment 432 may be locked. The user device 120 may be used to unlock the hollow compartment 432 to allow a homeowner and/or approved visitor to access the key inside. In some embodiments, the hollow compartment 432 may be implemented on the apparatus 100 (e.g., the compartment 380).

The flexible joint 424 may be configured to adjust the direction of the apparatus 100 and the holder portion 426. The flexible joint 424 may be configured to be directed (angled) and/or rotated. The flexible joint 424 may be moved while still providing support for the holder portion 426 and a connection to the base 422. In some embodiments, the flexible joint 424 may comprise wiring to communicate data between the apparatus 100 connected to the holder portion 426 and the base 422.

The holder portion 426 may securely hold the apparatus 100. The holder portion 426 may comprise a connector 436 (e.g., a magnet, double-sided tape, a threaded connector, etc.) to securely attach to the apparatus 100. The connector 436 may provide a secure attachment to the apparatus 100 and/or an electrical connection. For example, the electrical connection implemented by the connector 436 may enable the apparatus 100 to send/receive data to/from the base 422. In an example, audio data may be generated by the apparatus 100 (e.g., the audio processing component 356) transmitted by the connector 436 through the flexible joint 424 to the base 422 and the high-quality speaker of the base 422 may playback the audio data.

Figure 13:
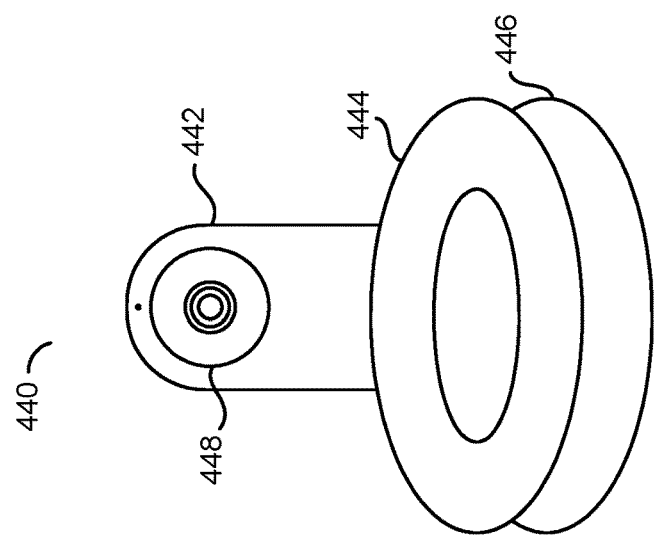
FIG. 13 is a diagram illustrating a table-top docking station.

Referring to FIG. 13, a diagram illustrating a table-top docking station 440 is shown. The docking station 440 may comprise a base 442, a motorized support 444 and a motorized support 446. The docking station 440 may be an accessory for the apparatus 100.

The docking station 440 may be implemented as a table-top accessory for the apparatus 100. The docking station 440 may provide a finished cover for a back of the apparatus 100. The apparatus 100 may sit on the motorized support 444 and/or the motorized support 446. The motorized support 444 and/or the motorized support 446 may provide 360 degree panning and/or an adjustable 30 degree tilt for the apparatus 100.

The base 442 may comprise a connector 448. The connector 448 may provide a mechanical support and/or an electrical connection. For example, the connector 448 may be configured to provide mechanical support to keep the apparatus 100 upright and/or aligned. In another example, the connector 448 may provide DC power to the apparatus 100. In yet another example, the connector 448 may communicate data and/or control signals to/from the apparatus 100. For example, the companion application 160 may be used by the user 62 to select a rotation angle and the apparatus 100 may receive the instructions from the smartphone 120, generate the control signals, and send the control signals to the motorized support 444 and/or the motorized support 446 via the connector 448.

Figure 14:
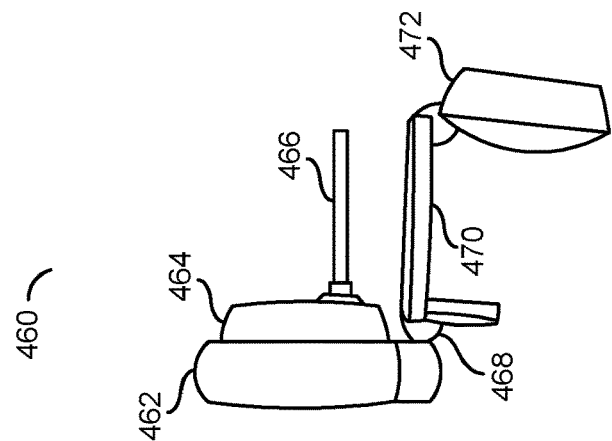
FIG. 14 is a diagram illustrating a TV docking station.

Referring to FIG. 14, a diagram illustrating a TV docking station 460 is shown. The TV docking station 460 may implement a webcam with a TV mounting bracket. The TV docking station 460 may comprise a base 462, a TV mounting bracket 464, a TV support 466, a flexible joint 468, a connector 470 and/or an adjustable mount 472. The TV docking station 460 may be an accessory for the apparatus 100.

The base 462 may provide support and/or a connection to a wall. The TV mounting bracket 464 may support a TV and/or monitor. The TV support 466 may provide a secure connection to a TV and/or monitor. In one example, TV support may be an adjustable stand. In another example, the TV support may be a mount (e.g., a VESA mount). The TV mounting bracket 464 and/or the TV support 466 may be used to hang a TV above the apparatus 100.

The flexible joint 468 may connect to the base 462. The flexible joint 468 may be configured to adjust the direction of the apparatus 100 and the connector 470. The flexible joint 468 may be configured to be directed (angled) and/or rotated. The flexible joint 468 may be moved while still providing support for the connector 470 and a connection to the base 462. In some embodiments, the flexible joint 468 may comprise wiring to communicate data between the apparatus 100 connected to the adjustable mount 472 and the base 462.

The connector 470 may be configured to support the adjustable mount 472. The connector 470 may extend the adjustable mount 472 beyond the connection to the TV so that the field of view of the apparatus 100 is not obstructed by the TV held by the TV support 466. The adjustable mount 472 may be configured to support the apparatus 100. The adjustable mount 472 may be rotated and/or swiveled to adjust the areas within the fields of view captured by the apparatus 100.

The TV docking station 460 may be implemented to mount a TV/monitor and/or provide security to prevent theft of the TV. In an example, the TV docking station 460 may be used in a public area such as sports bars, restaurants, reception areas, etc. The apparatus 100 attached to the adjustable mount 472 may capture the video streams VS1-VS2 of anyone attempting to steal the mounted TV (e.g., anyone approaching the TV and/or anyone under the TV).

Figure 15:
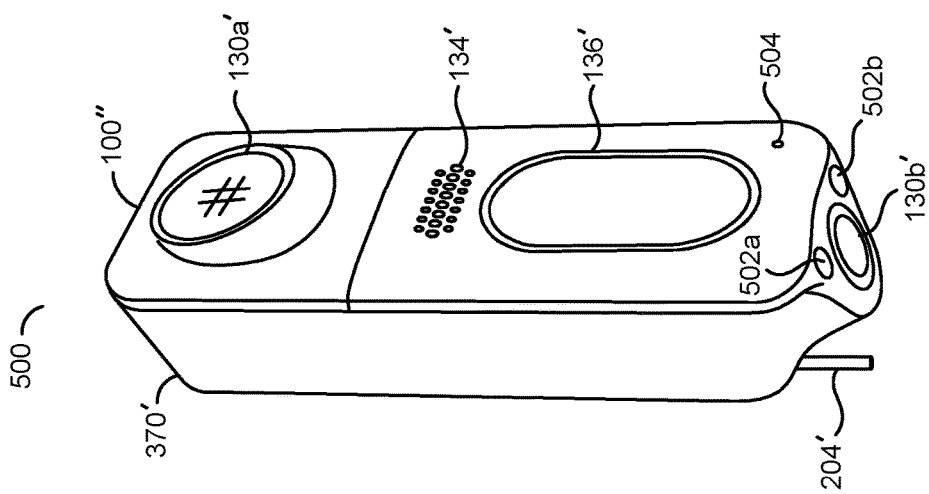
FIG. 15 is a diagram illustrating a perspective view of an example embodiment of the invention.

Referring to FIG. 15, a diagram illustrating a perspective view 500 of an example embodiment of the invention is shown. The apparatus 100" is shown. The perspective view 500 of the apparatus 100" may show the forward facing lens 130a', the bottom lens 130b', the speaker grille 134', the button 136', the cable 204' and/or the housing 370'. In some embodiments, the forward facing lens 130a' may be angled slightly upwards.

The apparatus 100" may further comprise lights 502a-502b. In some embodiments, the lights 502a-502b may be implemented to illuminate the area 118b. For example, if the capture device 102b has a lower image quality than the capture device 102a, illumination using the lights 502a-502b may improve video data captured in dark environments. In some embodiments, the lights 502a-502b may implement IR scanners. The IR scanners implemented using the lights 502a-502b may be configured to detect and/or scan various codes (e.g., bar codes, tracking numbers, QR codes, etc.). For example, if the package 180 is left under the apparatus 100", the lights 502a-502b may scan the tracking number and provide a notification to the user 62 via the companion application 160.

The apparatus 100" may further comprise a status light 504. The status light 504 may indicate an operational mode of the apparatus 100". In one example, the status light 504 may be off when the video data is not being recorded (e.g., no visitors or objects are detected and the video data is captured and analyzed, but not stored long term). In another example, the status light 504 may be colored red to indicate that the video data is being recorded. In yet another example, the status light 504 may be orange to indicate that the apparatus 100" is in an armed state (e.g., the package 180 has been detected and the apparatus 100" is on high alert for potential package thefts). The color of the status light 504 and/or the various operating modes of the apparatus 100" may be varied according to the design criteria of a particular implementation.

Figure 16:
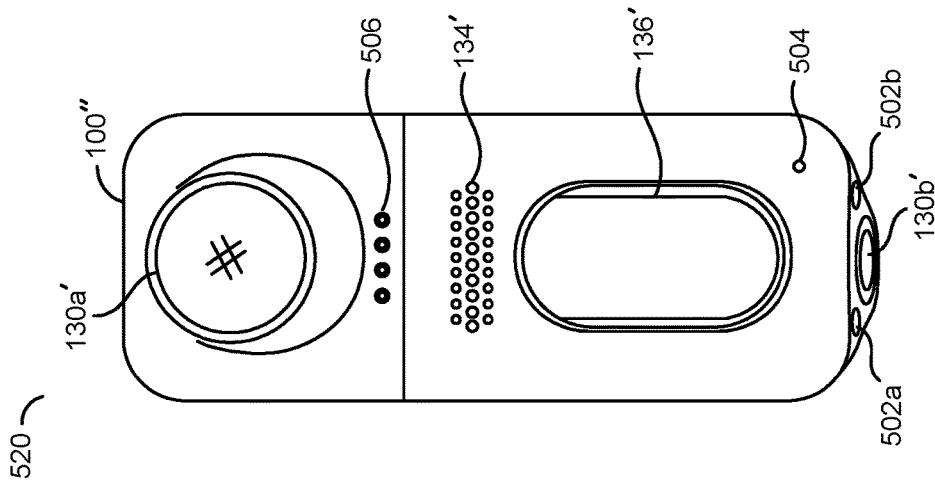
FIG. 16 is a diagram illustrating a front view of an example embodiment of the invention.

Referring to FIG. 16, a diagram illustrating a front view 520 of an example embodiment of the invention is shown. The apparatus 100" is shown. The front view 520 of the apparatus 100" may show the forward facing lens 130a', the bottom lens 130b', the speaker grille 134', the button 136', the lights 502a-502b and/or the status light 504.

A bottom portion of the apparatus 100" is shown angled forward. For example, angling the bottom portion forward may enable the bottom lens 130b' to be visible from the front view 520. Angling the bottom lens 130b' may enable the field of view 116a-116b to partially overlap with the field of view 114a-114b of the forward lens 130a'. When the two fields of view 114a-114b and 116a-116b overlap, a portion of the area 118a and a portion of the area 118b may have form a common field of view (e.g., the area 132 shown in association with FIG. 2). The apparatus 100" may be configured to triangulate a distance to moving objects in the common field of view. Triangulating the distance of moving objects may enable the video processor 106 to differentiate between objects that might be interesting and/or noteworthy (e.g., visitors approaching the premises 302a, the package 180 being delivered, a vehicle driving up the driveway) and other types of movement (e.g., distant cars driving by on the street, shadows, trees, bushes, etc.).

The overlapping field of view (e.g., the area 132) may enable the video processor 106 to implement stereo vision. The stereo vision may enable the apparatus 100" to determine the distance, size, speed and/or direction of movement of an object based on analyzing the two different perspectives of the overlapping field of view 132 captured by the capture devices 102a'-102b'. In one example, with the apparatus 100" mounted at approximately 4 feet high and with the bottom lens 130b' at a 60 degree angle, the lenses 130a'-130b' may have the overlapping field of view 132 at lower than 3 feet in height and at a distance of about 1.5 feet and goes to 0 feet (e.g., ground level) at a distance of about 6.5 feet. The location of the overlapping field of view 132 may change when the mounting height of the apparatus 100" is varied and/or the field of view 116a-116b of the bottom lens 130b' is adjusted. The location of the overlapping field of view 132 may be varied according to the design criteria of a particular implementation.

Information determined by the video processor 106 about objects in the overlapping field of view 132 using the stereo vision may be presented to the companion application 160. For example, the user 62 may receive information corresponding to a direction of movement of the object and/or a distance of an object to the apparatus 100" on the companion application 160.

In some embodiments, the button 136' may comprise the fingerprint scanner 202. In some embodiments, the fingerprint scanner 202 may be used by the apparatus 100" to control a door lock and/or doorbell. For example, the fingerprint scanner 202 may detect the fingerprint of the finger pressing the button 136' and store the fingerprint (e.g., in the memory 360 and/or the cloud database 318). The apparatus 100" (or the cloud service 310 using cloud processing) may be configured to review and/or categorize the fingerprint of each person detected for future detection of the same fingerprint.

The stored fingerprint may be used by the apparatus 100" to perform an operation (e.g., generate control signals) when the same fingerprint is detected again. For example, if the fingerprint is the homeowner, when the fingerprint scanner 202 detects the same fingerprint, the apparatus 100" may generate a control signal to unlock the door (e.g., one or more of the access points 304a-304n) and/or unlock the compartment 380. In another example, if the fingerprint is a delivery person, when the fingerprint scanner 202 detects the same fingerprint, the apparatus 100" may generate a control signal to unlock a particular entrance (e.g., access to a location for depositing the package 180). In yet another example, if the fingerprint is an unwanted guest (e.g., a door-to-door salesperson), when the fingerprint scanner 202 detects the same fingerprint, the apparatus 100" may deactivate the doorbell feature (e.g., so the homeowner can ignore the salesperson without being disturbed by a doorbell chime).

Other responses based on the fingerprint detected by the fingerprint scanner 202 may comprise sending an alert to the user 62 (e.g., via the companion application 160), sending an alert to the receptionist 312 (e.g., a private security firm) and/or sending an alert to the authorities 314. The categories of visitor detecting using fingerprints and/or the control signals (e.g., responses) generated by the apparatus 100" may be varied according to the design criteria of a particular implementation. Similar detections and/or responses by the apparatus 100" may be implemented using facial recognition implemented by the video processor 106. Implementing the database of fingerprints and the facial recognition may provide more accurate detection and/or identification of the visitor 170.

Figure 17:
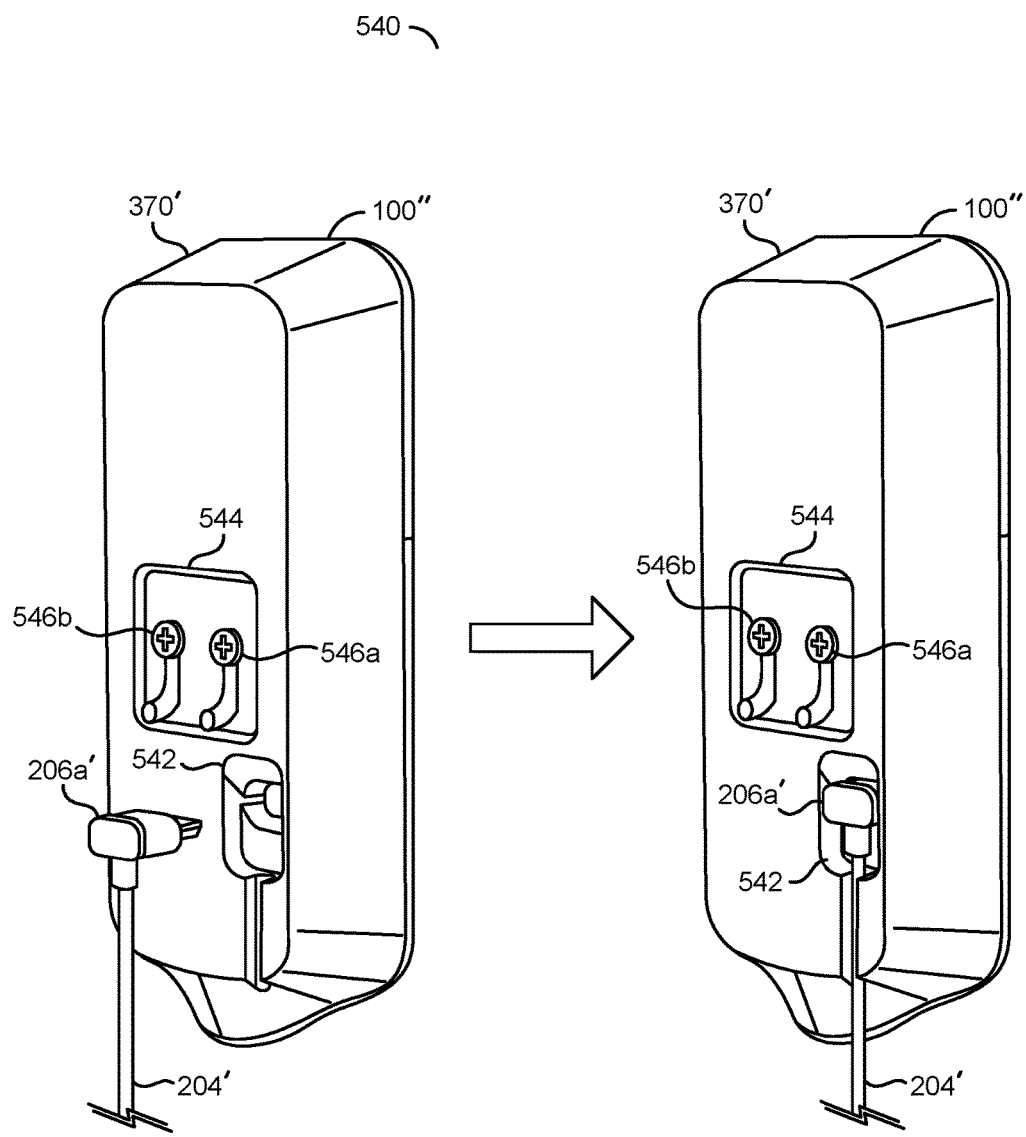
FIG. 17 is a diagram illustrating a rear view of an example embodiment of the invention.

Referring to FIG. 17, a diagram illustrating a rear view 540 of an example embodiment of the invention is shown. The apparatus 100" is shown with the cable 204' unplugged and the cable 204' plugged in. The rear view 540 of the apparatus 100" may show the housing 370', the cable 204', the connector 206a', a cable slot 542, a rear panel 544 and/or mounting screws 546a-546b.

The cable slot (or pocket) 542 is shown as an opening on the rear of the housing 370'. The cable slot 542 may be configured to fit one or more types of the cable 204' and/or the connector 206a'. The cable slot 542 may be configured to enable the cable 204' and/or the connector 206a' to connect to the apparatus 100" (e.g., to the circuit 104) and fit flush (or inset) on the housing 370'. For example, the cable slot 542 may ensure that the cable 204' and/or the connector 206a' does not protrude from the apparatus 100" (e.g., protruding from the rear may prevent a flush mount on a flat surface). In the example shown, the cable 204a' may be a USB cable and the connector 206a' may be implemented as a right angle connector. The shape and/or size of the connector slot 542 may be varied according to the design criteria of a particular implementation.

The rear panel 544 may be inset on the rear of the housing 370'. The rear panel 544 may be comprise various components for connecting to the apparatus 100" and/or the mount the apparatus 100" to a wall (e.g., a vertical surface). In the example shown, the rear panel 544 may comprise the mounting screws 546a-546b. The mounting screws 546a-546b may be configured to enable the apparatus 100" to be mounted flush against the wall 52 (e.g., a vertical surface). The implementation of the mounting screws 546a-546b may be varied according to the design criteria of a particular implementation.

Figure 18:
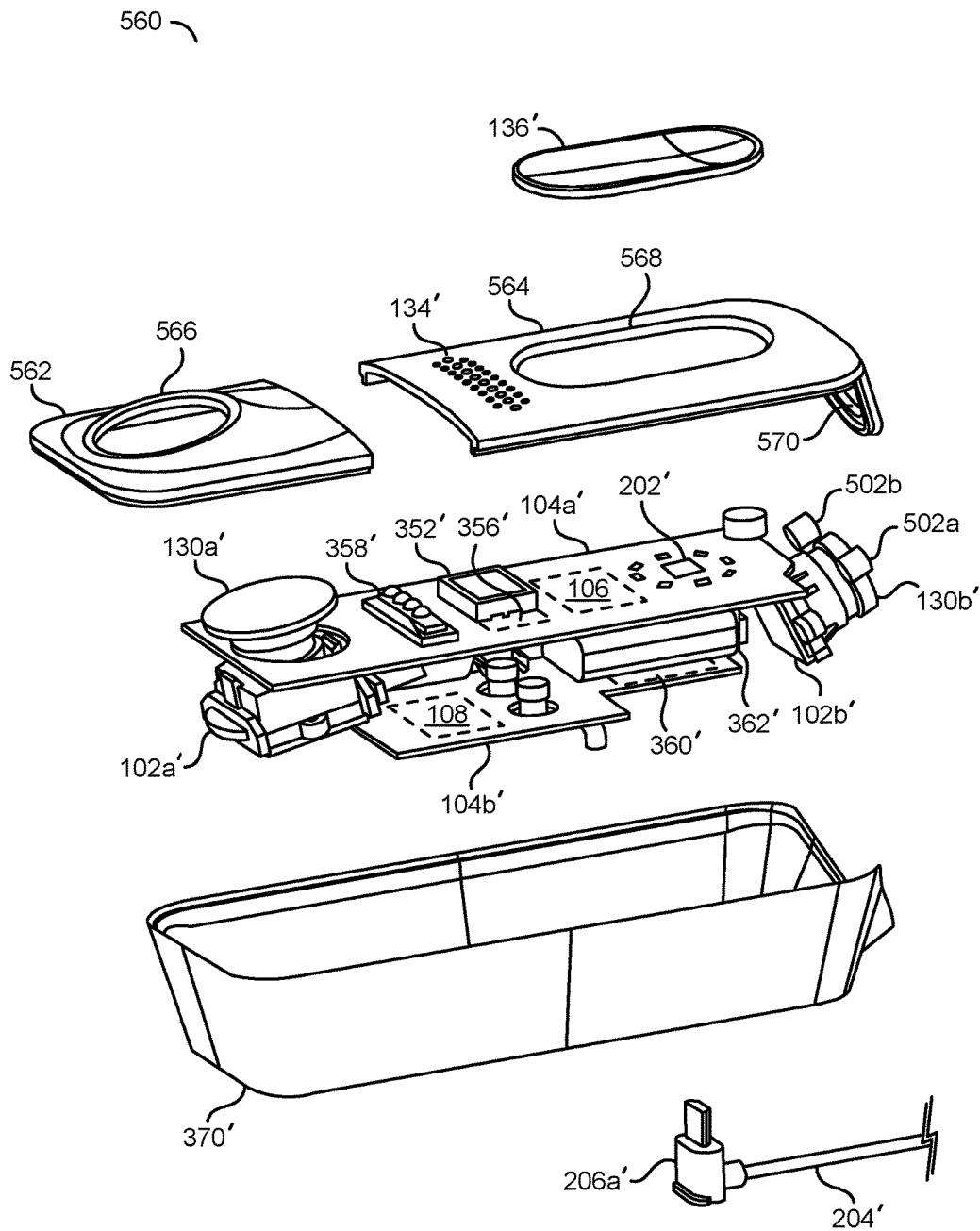
FIG. 18 is a diagram illustrating an exploded view of an example embodiment of the invention.

Referring to FIG. 18, a diagram illustrating an exploded view 560 of an example embodiment of the invention is shown. In the exploded view 560, various example components of the apparatus 100" are shown. The cable 204' and the connector 206a' are shown. The housing 370' is shown. The circuit boards 104a'-104b' are shown. An upper front cover 562 and a lower front cover 564 are shown. And the button 136' is shown. The apparatus 100" may comprise other components (not shown). The number, type and/or arrangement of the components of the apparatus 100" may be varied according to the design criteria of a particular implementation.

The upper front cover 562 may comprise an opening 566. The opening 566 may be configured to fit the lens 130a'. The lower front cover 564 may comprise the speaker grille 134', an opening 568 and/or an opening 570. The opening 568 may be configured to fit the button 136'. The opening 570 may be configured to fit the lens 130b'. The lower front cover 564 may further comprise a light pipe (e.g., for the lights 502a-502b).

In the example shown, the apparatus 100" may comprise the circuit boards 104a'-104b'. In some embodiments, the circuit 104 may be implemented as a single circuit board. The arrangement and/or number of circuit boards for implementing the functionality of the circuit 104 may be configured based on size and space constraints of the housing 370'. For example, if the apparatus 100" is implemented as a video doorbell with two fields of view, the space constraints of the housing 370' may be about the size of a standard doorbell and/or discreet security camera. Similarly, the various components on the circuit boards 104a'-104b' may be arranged (e.g., placement on the board, which side of the board the component is located on, which board the component is on, etc.) according to various constraints (e.g., size, space, thermal, communication, etc.).

In the example shown, the circuit board 104a' may comprise the capture devices 102a'-102b', the video processor 106, the lenses 130a'-130b' (e.g., connected to the capture devices 102a'-102b'), the fingerprint scanner 202', the speaker 352', the audio processor 356', the microphone component 358', and/or the lights 502a-502b (e.g., connected to the lens 130b'). The circuit board 104b' may comprise the wireless communication device 108, the storage component 360' and/or the power storage/power conversion component 362'.

The memory 360' may store images, audio, and/or other data. Data stored in the memory 360' may be compared to various signals from sensor modules implemented by the circuits 104a'-104b'. In one example, the data stored in the memory 360' may be a password. The processor 106 may compare the password with signals from the sensor modules. The comparison may determine which control signals to generate.

The speaker 352' may generate audio signals. The speaker 352' may be implemented as one or more speakers. In one embodiment, the speaker 352' may be configured to generate a moderate volume sound (e.g., 75 dB at a range of 1 meter).

However, the particular volume generated may be varied to meet the design criteria of a particular implementation.

In another embodiment, the audio processing component 356' may be configured to stream audio signals from the mobile devices 120a-120n, and/or other devices within range of the apparatus 100". The communication module 108 (e.g., a Wi-Fi antenna) may be configured to communicate with the mobile devices 120a-120n, and/or other devices to send and/or receive audio signals. In some embodiments, the communication module 108 may comprise a connection port that may be configured to communicate with various devices to send and/or receive audio signals (e.g., via USB). The audio signals may be stored in the memory 360'. In one example, the speaker 352' may generate audio signals to attract outdoor wildlife and/or chase away undesired wildlife. The apparatus 100" may capture images of the wildlife. Images may be stored in the memory 360'. An alert may be sent to the user via the companion application 160.

The microphone component 358' may receive audio signals. Audio signals detected by the microphone 358' may be used by the circuits 104a'-104b' to generate various control signals. In one example, audio signals generated by the visitor 170 may be received by the microphone 358' to generate a control signal used to control the light bulb 80, and/or control the door 174 (e.g., opening, closing, and/or locking a door). Audio signals detected by the microphone 358' may be used as an audio password. For example, voice recognition may be used to generate a password. The audio password may be needed to allow the apparatus 100" to generate various control signals.

The communication module 108 may receive and/or transmit data signals. The communication module 108 may register electromagnetic signals, acoustic signals, and/or other signals. The communication module 108 may provide control signals to turn on the light bulb 80, create sound from one or more speakers, send alerts to users, and/or send other wireless signals.

The power adapter 362' may receive electrical power from the premises. Electrical power from the premises may be presented to the circuits 104a'-104b'. The power adapter 362' may convert the electrical power. The converted electrical power may provide a power supply to the various components attached to the circuit boards 104a'-104b'. In one example, the power adapter 362' may be implemented as a 5V power adapter.

In some embodiments, the apparatus 100" may comprise a configuration port. In an example, the cable 204' may connect to the configuration port. The connection port may be configured to connect to an external device such as a computer and/or mobile device. The configuration port may be configured to allow the user 62 to have access to a Wi-Fi setup for the communication module 108, store data (e.g., audio files) in the memory 360' and/or update firmware. The firmware may be stored on the memory 360'. The firmware may store instructions that, when executed by the processor 106, implement one or more steps and/or control actions.

The circuits 104a'-104b' may comprise various sensor modules (e.g., environmental sensors). In an example, the circuits 104a'-104b' may comprise an electromagnetic field sensor, an acoustic field sensor, a voice recognition sensor, a facial recognition sensor, a gesture sensor, a weather sensor and/or other sensors (e.g., a PIR motion detector to detect people and/or animals). One or more of the sensor modules, or a combination of the sensors modules may be implemented internally (e.g., within the housing 370'), or alternatively may be implemented externally (e.g., as a separate sensing device coupled to the apparatus 100"). Input received by the sensor modules may be used to generate control signals.

In one example, the electromagnetic field sensor may detect electromagnetic fields generated by appliances, other electronics, and/or other sources of electromagnetic fields within the range of the apparatus 100". Disturbances in the electromagnetic field may be used by the processor 106 to detect potential visitors and/or other objects.

In one example, the acoustic field sensor may detect acoustic fields generated within the range of the apparatus 100". Such disturbances in the acoustic field may be used to detect potential visitors and/or other objects.

In one example, the voice recognition sensor may be configured to recognize audio signals such as voices. The microphone 358' may present audio signals to the voice recognition sensor. Signals detected by the voice recognition sensor may be used by the apparatus 100" to generate various control signals. In one example, audio signals and/or a command voice may be needed (e.g., a password) to allow the apparatus 100" to generate various control signals (e.g., open the compartment 380). The voice recognition sensor may be implemented by the audio processor 356'.

In one example, the facial recognition sensor may be configured to recognize the facial and/or other features of a person and/or of other objects. Signals detected by the facial recognition sensor may be used by the video processor 106 to generate various control signals. In one example, facial recognition and/or recognition of other features of a person and/or other object may be needed to allow the apparatus 100" to generate various control signals.

In one example, the gesture sensor may be configured to recognize gestures and/or movement of a person and/or other object. Signals detected by the gesture sensor may be used by the processor 106 to generate various control signals. In one example, a particular gesture and/or combination of movements may be needed to allow the processor 106 to generate various control signals. The facial recognition sensor and/or the gesture sensor may be implemented by the video processor 106.

In one example, the weather sensor may be configured to detect various weather variables such as temperature, humidity and/or atmospheric pressure. The weather sensor may be comprised of a photodiode. The photodiode may be configured to determine daytime, nighttime, and/or the amount of light in the environment. Signals detected by the weather sensor may be used by the apparatus 100" to generate various control signals. In one example, notifications about the weather may be sent to the user 62 using the companion application 160. In another example, the amount of light in the environment may be used to control curtains and/or blinds to prevent and/or allow a particular amount of light through a window. In another example, light intensity of the light bulb 80 may be increased as light in the environment decreases. An increase in light intensity of the light bulb 80 may ensure there is sufficient light for the capture devices 102a'-102b' to properly function. Controlling light intensity of the light bulb 80 may eliminate the need for an IR light source in a camera during nighttime operation. The IR light source may be implemented in the light bulb 80.

The capture devices 102a'-102b' may be configured to capture video data. For example, the capture devices 102a'-102b' may each implement a 720p HD video camera. In some embodiments, the capture devices 102a'-102b' may each capture video data at different resolutions. The video data may be high-resolution video frames and/or audio data.

The quality of the video data may be varied according to the design criteria of a particular implementation. Generally, the quality of the video data is enough to support object detection (e.g., facial recognition, motion detection, object identification, tagging, etc.).

The lenses 130a'-130b' may be configured to receive and/or focus light from the surrounding environment. The light received and/or focused by the lenses 130a'-130b' may be provided to the capture devices 102a'-102b'. In some embodiments, a lens cover may be implemented for the lenses 130a'-130b'. The lens cover may be configured to cover a top portion of the lenses 130a'-130b'. The lens cover may be configured to reduce an amount of glare captured in the video data.

The video processor 106 may be configured to perform various video operations. The video processor 106 may generate video data (e.g., the video streams VS1-VS2) in response to the video frames 110a-110n captured by the capture device 102a' and the video frames 112a-112n captured by the capture devices 102b'. The video processor 106 may be configured to encode and/or decode video data into various formats. The video processor 106 may be configured to compress and/or stream video data.

The video processor 106 may be configured to analyze the video data in real time. The video analysis performed by the video processor 106 may detect, recognize and/or classify objects. For example, the objects may comprise people (e.g., the visitor 170), animals, inanimate objects (e.g., the package 180), etc. The video analysis may be configured to learn patterns, recognize objects and/or recognize faces. The video processor 106 may be configured to de-warp the video captured (e.g., correct lens distortions). The video processor 106 may be configured to combine multiple fields of view into one image.

In some embodiments, the lights 502a-502b may be IR sensors. The IR sensors 502a-502b may be used to detect motion. For example, one of the sensor modules may be the IR (or PIR) sensor. In some embodiments, information from the IR sensors 502a-502b may be used to activate the capture devices 102a'-102b' (e.g., begin recording). In some embodiments, the IR sensors 502a-502b may provide additional information to the capture devices 102a'-102b' to detect visitors. The sensitivity of the IR sensors 502a-502b may be adjustable. For example, the application 160 may be provided to the user 62 (e.g., a program, a web-based front end interface, a mobile application, etc.) to adjust the sensitivity of the capture devices 102a'-102b' and/or the IR sensors 502a-502b.

The apparatus 100" may be configured to be weatherproof. The apparatus 100" may be installed at indoor and/or outdoor locations. For example, the apparatus 100" may be waterproof and/or water resistant. The apparatus 100" may be configured to operate in direct sunlight, cold climates and warm climates. For example, the apparatus 100" may operate in temperatures ranging from −40 F to 131 F. The apparatus 100" may have an ingress protection marking and/or an international protection marking rating of IP44. For example, the apparatus 100" may be effectively protected against water splashing against the housing 370' from any direction and/or protected against objects (e.g., wires, screws, etc.) greater than 1 mm in size.

The communication module 108 may be configured to connect to a local network and/or a wide area network (e.g., the internet). In some embodiments, the communication module 108 may be configured to implement one or more types of communications protocols. For example, the communication module 108 may support a Wi-Fi connection and/or a Bluetooth connection. In some embodiments, the communication module 108 may be distributed as multiple circuits on the circuits 104a'-104b' (e.g., a processing chip for each communications protocol). Other types of communications protocols may be implemented according to the design criteria of a particular implementation. In some embodiments, the communication module 108 may implement the Bluetooth connection to connect to the user devices 102a-102n (e.g., a smartphone) to provide an interface for configuring the apparatus 100" (e.g., to allow the user to input local network settings). In some embodiments, the communication module 108 may implement the Wi-Fi connection to connect to a cloud service via the internet.

In some embodiments, the apparatus 100" may be configured to upload data (e.g., the captured video data) to the cloud service. For example, the data uploaded to the cloud service may be streamed to the user device. The user device may connect to the cloud service to allow the user to request the stored video data. For example, the video data may be sent to the user device as a live (or nearly live) video stream. The data traffic to/from the cloud services may be encrypted (e.g., AES 128-bit encryption, AES 256-bit encryption, etc.). User account passwords may be salted and hashed with a cryptographic hash function.

In some embodiments, the apparatus 100" may store the captured video data (e.g., in the memory 360'). In some embodiments, the video data may be uploaded to the cloud service. Generally, the cloud service and/or the memory 360' may have a limited storage capacity. In some embodiments, the apparatus 100" may analyze the captured video data (e.g., using the processor 106) and/or data from the IR sensor to perform a particular type of detection. For example, the apparatus 100" may detect objects, motion and/or visitors within 3 meters (e.g., 10 feet). The apparatus 100" may initiate storage of the video data in response to the particular type of detection. The detection performed by the apparatus 100" may be used to detect objects approaching the premises.

For example, the apparatus 100" may initiate storage of the video data in response to motion detection. The companion application 160 may be used to allow a user to set a motion threshold for the apparatus 100". For example, a lower motion threshold may be more sensitive to motion. In another example, a higher motion threshold may be less sensitive to motion (e.g., reduce a number of false positives). The motion threshold may be adjustable.

In some embodiments, the apparatus 100" may initiate storage of the video data in response to detecting and/or locating a person and/or other type of object in the video data. For example, the apparatus 100" may analyze the video data to detect people and/or animals. In some embodiments, facial recognition may be implemented to identify and/or recognize visitors. In some embodiments, the video data may be analyzed to determine a behavior of the visitors.

The video processor 106 may implement machine learning techniques to improve detection accuracy of visitors and/or objects. For example, the user may be able to provide a correct and/or incorrect label to a detection performed by the video processor 106. If the detection is incorrect, the incorrect label may be used by the apparatus 100" to incorporate an incorrect result of the detection into the machine learning techniques. In some embodiments, the machine learning techniques may be implemented in the cloud service (e.g., the analysis is performed using cloud computing resources). Video data and/or correct/incorrect labels may be uploaded and/or stored anonymously (e.g., without personal identification information). The apparatus 100" may be configured to ignore (e.g., not respond to, not track and/or not send notifications in response to) small animals and/or shadows.

In some embodiments, the apparatus 100" may be configured to send notifications to the companion application 160 in response to the detection. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user may create a user account (e.g., comprising at least an email address and a password as credentials) for the cloud service (e.g., via an app and/or a web-based interface). The user account may allow the user to configure preferences. The preferences may comprise the notification settings. The type of notifications sent by the apparatus 100" may be based on the notification settings.

In some embodiments, the notifications may be sent in response to the Wi-Fi signal. For example, the cloud services may detect that the apparatus 100" is no longer connected. The cloud services may send the notification to the user device indicating that the Wi-Fi connection was lost and/or disconnected. The communication module 108 may be configured to re-connect to the cloud services when the Wi-Fi connection is established.

In some embodiments, the apparatus 100" may be configured for two-way audio communications (e.g., an intercom). For example, a visitor may speak through the microphone 358'. The microphone 358' may receive the audio data. The communication module 108 may transmit the received audio to the user devices 102a-102n. The user devices 102a-102n may playback the audio to the user 62. The user 62 may speak via the user devices 102a-102n. The user devices 102a-102n may transmit the audio to the apparatus 100" via the communication module 108 (e.g., a Wi-Fi connection). The speaker 352' may transmit and/or stream the received audio.

The detection, the pre-recorded audio, the video streaming and/or the two-way audio communication may allow the user to observe the surrounding environment of the apparatus 100" from anywhere and at any time. For example, the apparatus 100" may be used to deter a burglar when a family is away from home (e.g., on vacation). In another example, the apparatus 100" may alert the user 62 of the package 180 being delivered to the home and the user 62 may provide instructions to the delivery person.

The system may combine multiple sensory signals (e.g., from the apparatus 100") to accurately characterize the behavior of a visitor. Characterization of the behavior of the visitor may be performed and/or presented to home/business owners in real time. For example, categorizations of the behavior of visitors may comprise the behavior typical of potential burglars, solicitors, delivery workers, residents, domestic helpers, strangers, friendly visitors with and/or without access to the premises, etc. The number and/or type of behavior categorizations may be varied according to the design criteria of a particular implementation.

Figure 19:
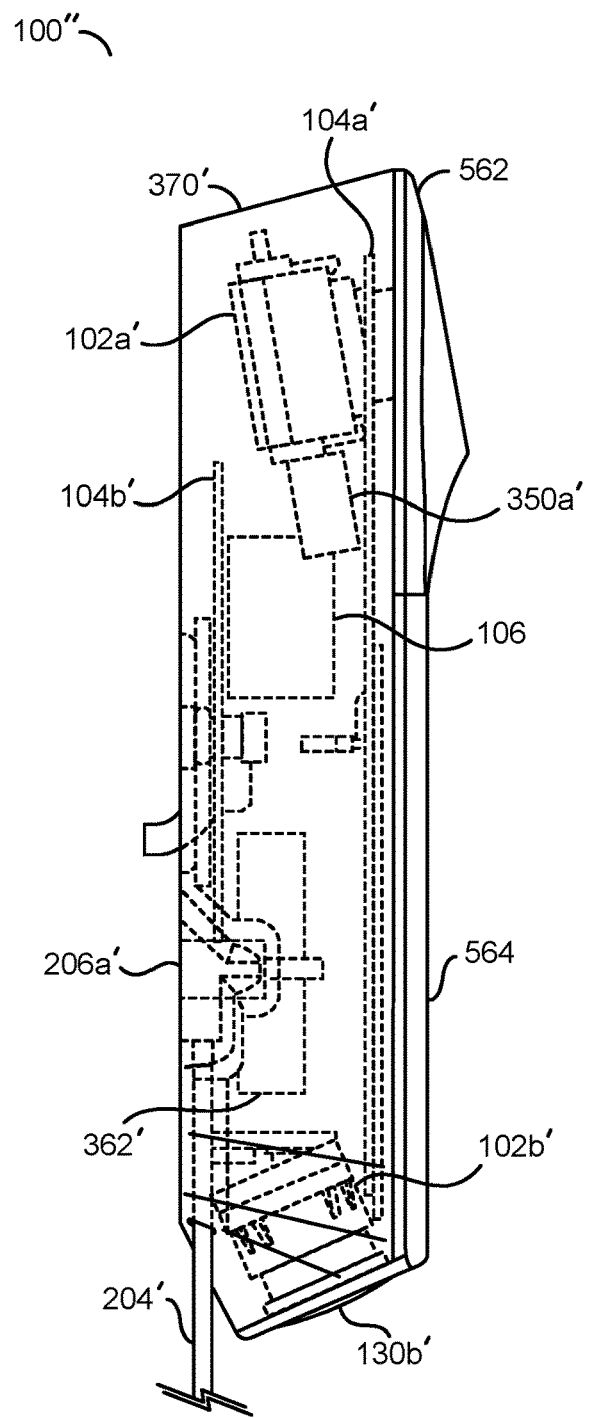
FIG. 19 is a diagram illustrating a side view of an example embodiment of the invention.

Referring to FIG. 19, a diagram illustrating a side view of an example embodiment 100" of the invention is shown. The components of the apparatus 100" are shown (e.g., as a wireframe illustration) within the apparatus 100". In the example shown, the components of the apparatus 100" are shown within the space constraints of the housing 370' and covered by the upper front cover 562 and the lower front cover 564. The bottom lens 130b' is shown slightly protruding from the lower front cover 564. The cable 204' is shown extending down from the housing 370'. The connector 206a' is shown inset flush within the cable slot 542.

The circuits 104a'-104b' are shown within the housing 370'. In the example shown, the capture devices 102a'-102b', the video processor 106, and/or the power storage/conversion component 362' are shown. The connector 350a' is shown connecting the capture device 102a' to the circuit board 104a'. The other components of the apparatus 100" may be within the housing 100" (not shown).

In some embodiments, the apparatus 100" may be implemented as a doorbell camera, a door camera and/or an indoor camera. The doorbell camera 100" receive wired power. In one example, the wired power may come from the cable 204' (e.g., a USB cable). In another example, the doorbell camera 100" may receive power from standard doorbell wiring for the premises 302a-302n. The apparatus 100" may be implemented with no blind spot (e.g., to the front or below the apparatus 100"), to enable seeing the front area 118a and the bottom area 118b (e.g., for viewing packages in front of the door 174). In one example, the apparatus 100" may be configured as a door camera system that may be mounted above the door 174. The apparatus 100" may implement a FBB camera (e.g., front, back and bottom). In some embodiments, the apparatus 100" may be configured as an indoor camera that may be a derivative of a doorbell style camera.

The apparatus 100" may be implemented as a low-cost product with many bundled features. The apparatus 100" may have an industrial design, beautiful and small. The apparatus 100" may operate with a power consumption of 3 W or less. A low power implementation may ensure that the apparatus 100" may receive power from a home doorbell system (e.g., standard doorbell wiring). The wireless communication device 108 of the apparatus 100" may provide a reliable Wi-Fi connection.

The apparatus 100" may be configured to reduce blind spots. In an example, the field of view 114a-114b may cover the front area 118a and the field of view 116a-116b may cover the area 118b below and/or behind the apparatus 100". The field of view 114a-114b and the field of view 116a-116b may have the overlapping region 132. For example, packages (e.g., the package 180) on the ground close to the door 174 may be visible to the capture devices 102a-102b'. In another example, the front door 174 may be visible, (e.g., the user 62 may see if the door 174 is open and/or if any flyers 176 are on the door 174). The wedge 400 may be used to help set the field of view 114a-114b and/or the field of view 116a-116b to cover the areas 118a-118b desired by the user 62.

The apparatus 100" may reduce a lag time for answering the door 174. The companion application 160 may enable communication with the visitor 170 within approximately 15 seconds. For example, when the visitor knocks on the door 174, instead of the user 62 walking to the door 174 to reply to the visitor 170, the companion app 160 may be used. For example, the apparatus 100" may implement a two-way intercom to allow the user 62 to speak to the visitor 170 without answering the door 174. In another example, the user 62 may speak with the visitor 170 using the companion app 160 even if the user 62 is not home (e.g., from work, while on vacation, while running errands, etc.).

The two camera lenses 130a'-130b', the capture devices 102a'-102b' and/or the video processor 106 may be configured to provide different video quality. In one example, the video processor 106 may be configured to encode and/or process the video frames 112a-112n captured from the bottom lens 130b' to have a lower video quality than the video frames 110a-110b captured by the forward facing lens 130*a*'. For example, the reduced video quality for the video generated from the video frames 112*a*-112*n* may be a lower resolution (e.g., 1080p for front capture device and 720P for bottom capture device). In some embodiments, the capture devices 102*a*' may implement a 1080p, 16:9 ratio, 160 degree field of view. In some embodiments, the capture device 102*b*' may provide 480p/720p video. Generally, the amount of processing/resources used by the video processor 106 to generate video from the video frames 112*a*-112*n* captured by the bottom capture device 102*b*' may be less than the amount of processing/resources used by the video processor 106 to generate video from the video frames 110*a*-110*n* captured by the forward capture device 102*a*'.

The field of view 116*a*-116*b* of the bottom camera 102*b*' may be 80 degrees down to see packages 180 and/or to see the door 174 about 3 inches below the apparatus 100". The camera angle may be adjustable by +/−15 degrees. The apparatus 100" may be approximately 1.7 in×4.6 in×1.0 in, operate at 16V AC-24V AC and/or implement a 10VA transformer. The capture devices 102*a*'-102*b*' may be implemented using a ⅓ inch, 3-megapixel (2K) color sensor, provide video HD UXGA 1600×1200, provide night vision (e.g., 850 nm infrared LEDs 502*a*-502*b*) and/or operate at 14° F. to 104° F. (−10° C. to 40° C.). The apparatus 100" may provide a chime connector to operate as a door chime (e.g., a doorbell). The apparatus 100" may be implemented with the wedge 400 (e.g., a 15° wedge). The wireless communication device 108 may be configured to support Wi-Fi 802.11a/b/g/n/ac, dual band and/or Bluetooth Low Energy (BLE).

In some embodiments, the apparatus 100" may be mounted with a camera floodlight (e.g., above a garage door) with a 155 degree diagonal lens. In an example, the lenses 130*a*'-130*b*' may be approximately 12 inches in front of the door, 3 inches above a passive infrared sensor (PIR) and/or 10 inches above the top of the door. In an example, the field of view 114*a*-114*n* and/or the field of view 116*a*-116*b* may be up to 6 feet in front of lenses 130*a*'-130*b*' and 3 inches below the lens 130*a*'-130*b*'. The garage door may be approximately at 12 inches behind the lens 130*b*'. The apparatus 100" may be about 5 inches in front of the door, and 4 feet above the ground.

In some embodiments, the apparatus 100" may implement a door camera for all doors and/or access points 304*a*-304*n* of the premises 302*a*-302*n*. In some embodiments, the apparatus 100" may receive light bulb power from the power adapter 220 (e.g., from a light bulb 216 implementing the USB port 218 and/or the light bulb socket adapter 250 providing the power adapter 220'). The power from the light bulb adapter may be shared by the apparatus 100" the wall mounted bracket 420 (e.g., for an indoor camera) and/or the smart light 210. The apparatus 100" may be configured to enable seeing and talking to people at the door 174. The apparatus 100" may be used with the companion application 160 to see if the door 174 is secured or not (e.g., closed and locked).

In some embodiments, the apparatus 100" may be implemented as an indoor camera. The indoor version of the apparatus 100" may use similar components and/or electronics (e.g., the components of the circuit 104). Some features may be removed and/or added for the indoor version. In some embodiments, a table-top docking station may be implemented (e.g., as shown in association with FIG. 13). In some embodiments, the wall mount bracket 422 may be the same for an indoor camera as the door camera embodiment. The indoor docking station may implement the same PCB, electronics, lens, etc. as the outdoor embodiment. In some embodiments, the docking station and/or the mount 422 may provide a flexible secure mount (e.g., the flexible joint 424) for canary flex.

In some embodiments, one or more of the wedges 400 may be added to the apparatus 100" to adjust the viewing angle. In some embodiments, the user devices 120*a*-120*n* may be modified smartphones. For example, the smartphones 120*a*-120*n* may be configured to operate using customized software (e.g., customized Android ROM and/or not a fully featured phone) to provide a cordless handheld video intercom via the companion application 160. The user devices 120*a*-120*n* may enable the user 62 to hear chimes and/or be able to respond in a timely manner. Generally, users at home want to see and talk to visitors without opening the door. For example, using a dedicated phone app may be too slow to respond. The customized smartphones 120*a*-120*n* may operate to quickly provide access to the intercom feature and/or video. For example, the customized smartphone may be an always on solution to interact using the apparatus 100". For example, the customized smartphones 120*a*-120*n* may implement a direct Wi-Fi connection to the apparatus 100" and/or cameras (e.g., using a local area connection and/or peer-to-peer without internet access).

The apparatus 100" may implement an RF transceiver for window/door sensors. In an example, the lights 502*a*-502*b* may be configured as RF transceivers. In some embodiments, the apparatus 100" may be configured to communicate with an indoor Wi-Fi light bulb to indicating someone at home. For example, the light bulb 80 may be implemented indoors and the apparatus 100" may respond to detecting the visitor 170 by activating the light bulb 80 (e.g., via the Wi-Fi connection). Activating the indoor light bulb 80 in response to a detected visitor 170 may help deter a potential thief (e.g., by making the premises 302*a* seem occupied by a person). For example, activating the light 80 in response to the visitor ringing the doorbell by pressing the button 136' may be a more realistic home owner response than activating the light 80 when motion is detected (e.g., such as standard PIR motion detection lights).

In some embodiments, the apparatus 100" may implement the fingerprint sensor 202' as part of the doorbell button 136'. In some embodiments, the apparatus 100" may implement a remote control lock box 380 for the house key 384. For example, the house key 384 may be securely stored within a locked compartment 380 of the apparatus 100". In one example, the companion application 160 may be configured to remotely unlock the compartment 380 to enable an authorized user (e.g., authorized by the companion application 160) to retrieve the house key 384 and enter the premises 302*a* and/or the secure package deposit 330.

In some embodiments, the wireless communication device 108 may be configured to implement a Wi-Fi range extender. For example, when the user 62 is outside (e.g., in the yard) and beyond the reach of the Wi-Fi of the premises 302*a*, the wireless communication device 108 may extend the home Wi-Fi range. In some embodiments, the apparatus 100" may be configured to implement a siren. In an example, the speaker 352' may be configured as a 6 watt speaker capable of producing an audio level of at least 95 dB. In some embodiments, the apparatus 100" may implement a door knock sensor. For example, the microphone component 358' may be configured to detect audio signals from the visitor 170. The audio processing component 356' may be configured to match the incoming audio signals captured by the microphone 358'. For example, if the visitor 170 decides to knock on the door instead of use the doorbell button 136' (or speak instead of knocking or ringing the doorbell), the audio processing component 356' may detect the sound of the knock (or voice) and determine whether or not to provide a notification to the user 62 (e.g., send a notification using the companion application 160).

In some embodiments, the apparatus 100" may implement a 4 in 1 camera lens. In an example, the bottom capture device 102b' may be implemented using a 480p or 720 resolution. The lenses 130a'-130b' of the capture devices 102a'-102b' may be a 160 degree (diagonal) and/or a 180 degree fish eye lens. The apparatus 100" may implement an IR LED (B&W) (e.g., the lights 502a-502b) for night vision for the top capture device 102a', and white LED (color) for the bottom capture device 102b'. In some embodiments, the apparatus 100" may implement a PIR sensor.

The bottom camera 102b' may be integrated as part of the apparatus 100" to remove blind spots (e.g., to capture areas not covered by the field of view 114a-114b of the front camera 102a') and/or to view the packages 180 and the door 174 at, behind, or beyond the plane 56 of the vertical surface 52 that the apparatus 100" is mounted to. The apparatus 100" may provide a front, back and bottom (FBB camera) view (e.g., to show the door 174 behind the apparatus 100"). In some embodiments, the apparatus 100" may be battery powered. In some embodiments, the apparatus 100" may be wire-powered (e.g., a wired connection to a power supply provided for the premises 302a). The apparatus 100" may implement a door camera system by integrating the FBB security camera and the wireless doorbell button 136'. In some embodiments, power may be received from the adjacent light fixture 210 (e.g., the socket adapter 250).

The apparatus 100" may be configured to be used with the user devices 120a-120n to display the front, back, and/or bottom views (live or recorded) simultaneously using the companion application 160. The apparatus 100" may integrate a door chime and/or video intercom. The wall mount bracket 422 may comprise a night vision LED (IR or White) 434 and/or the large speaker 134', which may implement a siren or a high quality music playback device. The user devices 120a-120n may be implemented using customized software for a low cost Android phone as a dedicated door chime and video intercom device.

In some embodiments, the apparatus 100" may connect to a Wi-Fi connected indoor light bulb 80 to indicate that someone is inside the home when the door camera is activated. The fingerprint sensor 202' may be implemented as part of the doorbell button 136'. The apparatus 100" may comprise the hollow compartment 380 to provide a remote controlled lock box for the house key 384. The lock box may be integrated with the door camera system. The small compartment 380 storing a house key may be unlocked remotely.

Figure 20:
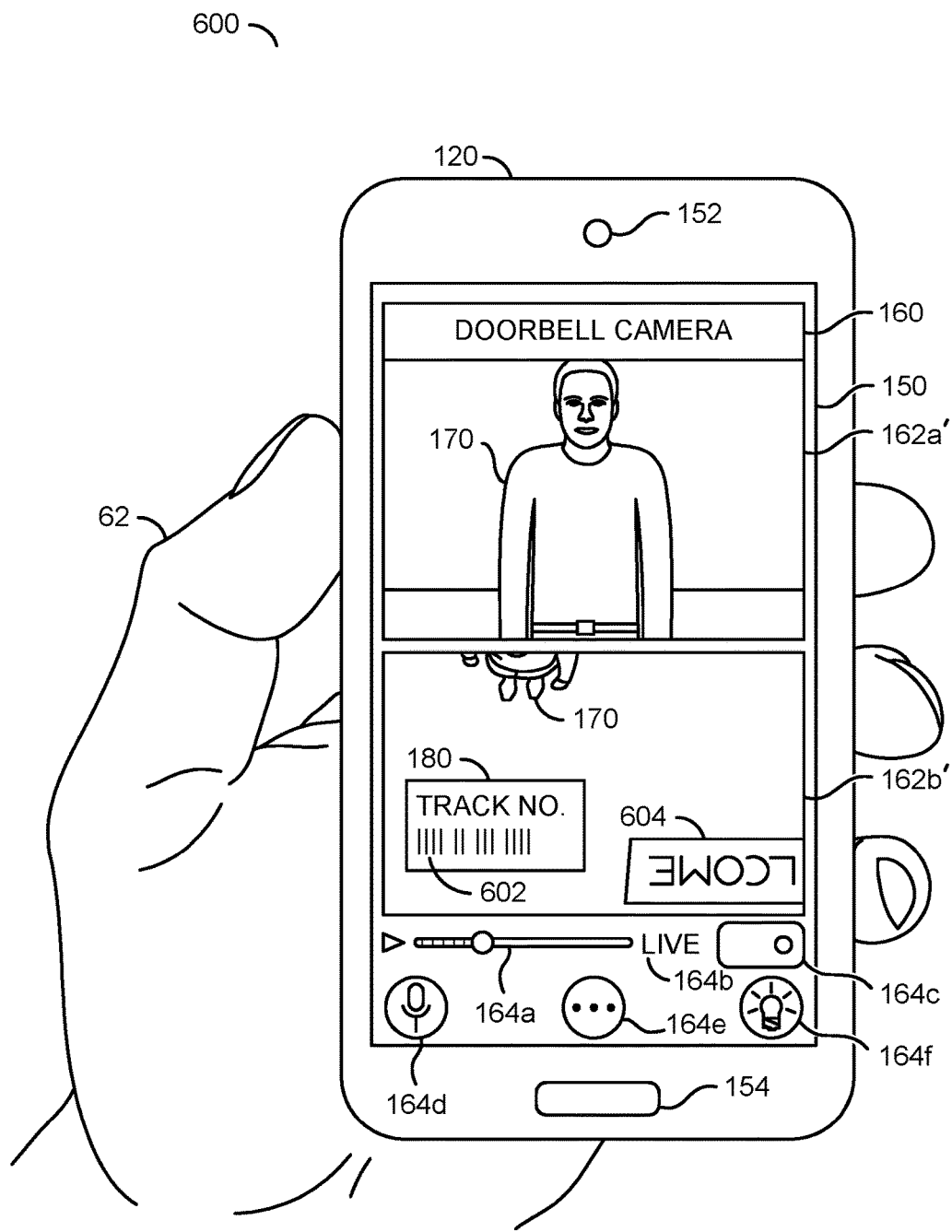
FIG. 20 is a diagram illustrating a user device streaming multiple video streams.

Referring to FIG. 20, a diagram illustrating a user device streaming multiple video streams is shown. An example context 600 of the invention is shown. In the example context 600, the user device 120 is shown held by the user 62. In the example shown, the user device 120 may be a smartphone and/or a customized smartphone implementing a video intercom.

The smartphone 120 is shown having the display 150, the speaker 152 and the microphone 154. The display 150 is shown displaying the companion application 160. In the example context 600 shown, the companion application 160 may display the video stream 162a' (e.g., the video stream VS1), the video stream 162b' (e.g., the video stream VS2) and/or the controls 164a-164f.

The video streams 162a'-162b' shown may be captured by the capture devices 102a'-102b' from the doorbell embodiment of the apparatus 100". In the example shown, the video stream 162a' may comprise a view captured by the front-facing capture device 102a'. For example, in a doorbell embodiment, the apparatus 100" may be mounted to the vertical surface 52 at approximately 48 inches from the ground (e.g., a standard doorbell height). The video stream 162a' may capture a view of the visitor 170 from the height of a doorbell. In the example shown, the field of view 114a-114b for the video stream 162a' may capture a waist, torso, chest and face of the visitor 170.

For the doorbell embodiment of the apparatus 100", the video stream 162b' may comprise a view captured by the bottom capture device 102b'. The bottom capture device 102b' may capture the area 118b below the apparatus 100". In the example shown, the video stream 162b' may comprise a high angle view of the bottom (e.g., from the waist down) of the visitor 170. The video stream 162b' may further comprise a view of the package 180. For example, the field of view 116a-116b for the bottom view video stream 162b' may be oriented to capture packages 180 left at the premises 302a. A tracking number 602 is shown on the package 180. A portion of a welcome mat 604 is also visible in the example shown.

The video processor 106 may be configured to scan the tracking number 602. For example, the image quality of the capture device 102b' may be high enough to enable the video processor 106 to read various tracking numbers (e.g., bar codes, numbers, QR codes, etc.). The video processor 106 may read and/or decipher the tracking number 602 using optical character recognition and/or object detection. In some embodiments, the wireless communication device 108 may be configured to send a notification using the companion application 160 to indicate that the package 180 with the tracking number 602 read by the video processor 106 has been delivered. In some embodiments, the user 62 may use the companion application 160 to store particular tracking numbers of expected packages, and the video processor 106 may compare the detected tracking number 602 against the stored tracking numbers.

Referring to FIG. 21, a diagram illustrating a wedge prism in front of a camera lens is shown. A context 620 is shown. The context 620 may comprise a wedge shaped prism 622 and the lens 130a". There are a number of ways (e.g., prisms and/or mirrors) to combine the areas 118a-118b of primary interest (e.g., the visitor face and the porch floor) into one image, with image pixels allocated to where the resolution is most needed.

The wedge shaped prism 622 may be located in front of the camera lens 130a". The wedge shaped prism 622 may comprise a flat edge 624 and an angled edge 626. The angled edge 626 may be located next to the camera lens 130a". In some embodiments, the lens 130a" may be closer to the same size as the wedge shaped prism 622.

In the example shown, the angled edge 626 may be configured to redirect part(s) of the field of view 114a-114b. In the example shown, the angled edge 626 may be angled downwards and the field of view 114a-114b may be redirected down to the floor (e.g., to view the blind spot of the lens 130a"). In another example, the angled edge 626 may be angled upwards to redirect part(s) of the field of view 114a-114b up to the face of the visitor 170. In some embodiments, the wedge shaped prism 622 may be rotatable to change the redirected field of view (e.g., change from the ground view to the face view).

Referring to FIG. 22, a diagram illustrating a partial wedge prism is shown. A context 640 is shown. The context

640 may comprise a partial wedge prism 622'. The partial wedge prism 622' may be located in front of the camera lens 130a".

The partial wedge prism 622' may comprise the flat edge 624', the angled edge 626' and/or a cut-out portion 642. In the example shown, the cut-out portion 642 may be approximately a quarter of the size of the partial wedge prism 622'. The partial wedge prism 622' may be rotatable to change which portion of the lens 130a" that the cut-out portion 642 is in front of to aim all or part of the captured image. The location and/or size of the cut-out portion 642 may be varied according to the design criteria of a particular implementation.

The cut-out portion 642 may enable the partial wedge prism 622' to redirect a portion of the field of view 114a-114b (e.g., the portion redirected by the angled edge 626') and not redirect another portion of the field of view 114a-114b (e.g., the portion passing through the cut-out portion 642). For example, the partial wedge prism 622' may enable the front capture device 102a' to capture the area 118a in front of the apparatus 100 and the area 118b below apparatus 100. The video processor 106 may combine views from the two angles into one image.

Referring to FIG. 23, a diagram illustrating a compound lens is shown. A context 660 is shown. The context 660 may comprise a compound lens 662. The compound lens 662 may be a combined prism/lens element configured to replace the front camera lens 130a".

The compound lens 662 may be implemented having multiple lensing surfaces (e.g., molded) into one combined lens. In the example shown, the compound lens 662 may have a lensing surface 664 and a lensing surface 666. The lensing surfaces 664-666 may be configured to aim in several directions (e.g. up and down). For example, the lensing surface 664 may be directed upwards and the lensing surface 666 may be directed downwards. The number, size or shape of the lensing surfaces 664-666 may be varied according to the design criteria of a particular implementation.

In some embodiments, the lensing surfaces 664-666 may smoothly transition between aiming directions to fill in a complete field of view with a lower resolution on the imaging sensor plane in the transition regions. For example, the lower resolution may be used for an area expected to show objects or views that may be less of interest (e.g., a waistline of the visitor 170). The lensing surfaces 664-666 and/or the transitions between the lensing surfaces 664-666 may cause distortion of the captured images. The distortion may be corrected by the video processor 106 in the image processing chain. The video processor 106 may be configured to combine the two angles captured by the different lensing surfaces 664a-666 into one image (e.g., one of the video frames 110a-110n).

The functions performed by the diagrams of FIGS. 1-23 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a first video capture device configured to capture a first plurality of video frames of a first field of view;
a second video capture device configured to capture a second plurality of video frames of a second field of view; and
a circuit configured to (i) generate a first video stream in response to said first video frames, (ii) generate a second video stream in response to said second video frames and (iii) wirelessly communicate said first video stream and said second video stream to a user device, wherein (a) said apparatus is mounted to a vertical surface, (b) said first field of view captures an area in front of said apparatus, (c) said first capture device is located on a front of a housing of said apparatus and directed away from a first side of said vertical surface, (d) said second field of view captures an area in front of, under and behind said apparatus, (e) said second capture device is located on an angled portion of said housing and directed at an angle away from said first side of said vertical surface, (f) said first capture device and said second capture device are both located on said first side of said vertical surface, (g) said second field of view comprises a blind spot of said first field of view and (h) said second field of view includes said vertical surface below a level of said apparatus.

2. The apparatus according to claim 1, wherein said second video stream is configured to provide video of at least one of (i) a door below said apparatus, (ii) packages left under said apparatus or (iii) both said door and said packages.

3. The apparatus according to claim 1, wherein (i) said first video capture device and said second video capture device each implement a wide angle lens and (ii) said wide angle lens enables said second field of view to capture an area behind a plane corresponding to said surface to which said apparatus is mounted.

4. The apparatus according to claim 1, wherein said user device is configured to receive and display said first video stream and said second video stream simultaneously.

5. The apparatus according to claim 1, wherein (i) said circuit comprises a video processor, (ii) said video processor is configured to (a) generate both said first video stream and said second video stream and (b) reserve less resources to generate said second video stream than said first video stream and (iii) said second video stream has a lower video quality than said first video stream.

6. The apparatus according to claim 1, configured to implement at least one of an intercom, a door chime, a siren or a combination of said intercom, said door chime and said siren.

7. The apparatus according to claim 1, further comprising a battery to provide power for components implemented by said apparatus.

8. The apparatus according to claim 1, wherein said apparatus is configured to receive power from a doorbell power supply.

9. The apparatus according to claim 1, wherein (i) said apparatus is configured to receive power from a light fixture and (ii) said power from said light fixture is received via a USB connection to a light bulb socket adapter comprising a USB port.

10. The apparatus according to claim 1, wherein said circuit is further configured to implement a wireless doorbell.

11. The apparatus according to claim 1, (i) further comprising (a) a speaker to present audio captured by said user device and (b) a microphone configured to capture visitor audio for playback by said user device and (ii) said apparatus provides a video intercom with said user device by implementing a wireless connection to said user device to (a) receive said audio captured by said user device and (b) present said first video stream to a video display of said user device.

12. The apparatus according to claim 1, wherein said first video stream and said second video stream are uploaded to a server computer to (i) generate a stored recording and (ii) provide a live view.

13. The apparatus according to claim 1, further comprising a button, said button (i) is configured to activate a doorbell when pressed and (ii) comprises a fingerprint sensor, wherein said apparatus is configured to perform an operation in response to a fingerprint detected by said fingerprint sensor.

14. The apparatus according to claim 1, wherein (a) said circuit is further configured to (i) detect a visitor and (ii) generate a notification signal in response to said visitor and (b) said notification signal is configured to enable an indoor Wi-Fi light bulb.

15. The apparatus according to claim 1, wherein (i) said apparatus is configured to attach to a wall mount bracket and (ii) said wall mount bracket comprises at least one of (a) a speaker configured to produce a sound level over 95 dB, (b) a lighting element to improve night vision or (c) a wireless communication device.

16. The apparatus according to claim 1, further comprising a lockable hollow compartment configured to (i) store a key and (ii) be remotely unlocked by said user device.

17. The apparatus according to claim 1, wherein said second field of view is adjustable by tilting said second video capture device.

18. The apparatus according to claim 1, wherein said first video capture device is configured to capture said first field of view and said second field of view by using at least one of (a) a mirror and (b) a prism.

19. The apparatus according to claim 1, wherein (i) said first field of view and said second field of view are configured to partially overlap each other to provide an overlapping field of view, (ii) said circuit is further configured to (a) triangulate a distance to an object in said overlapping field of view and (b) send information about characteristics of said object to said user device and (iii) said characteristics of said object comprise a direction of movement and said distance.

20. The apparatus according to claim 19, wherein said distance triangulated using said overlapping field of view is used to discriminate between objects of interest and unimportant objects.

* * * * *